(12) United States Patent
Duperray et al.

(10) Patent No.: US 12,110,141 B2
(45) Date of Patent: Oct. 8, 2024

(54) PACKAGING APPARATUS

(71) Applicant: Anheuser-Busch InBev S.A., Brussels (BE)

(72) Inventors: Philippe Jean Marie Duperray, Châteauroux (FR); Wim Dekocker, Leuven (BE)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 110 days.

(21) Appl. No.: 17/631,314

(22) PCT Filed: Jul. 30, 2020

(86) PCT No.: PCT/EP2020/071497
§ 371 (c)(1),
(2) Date: Jan. 28, 2022

(87) PCT Pub. No.: WO2021/019012
PCT Pub. Date: Feb. 4, 2021

(65) Prior Publication Data
US 2022/0258891 A1    Aug. 18, 2022

(30) Foreign Application Priority Data

Jul. 30, 2019  (EP) .................................. 19189041
Dec. 27, 2019  (EP) .................................. 19219856

(51) Int. Cl.
| | |
|---|---|
| *B65B 21/20* | (2006.01) |
| *B65B 35/36* | (2006.01) |
| *B65B 59/00* | (2006.01) |
| *B65G 47/32* | (2006.01) |

(52) U.S. Cl.
CPC .............. *B65B 21/20* (2013.01); *B65B 35/36* (2013.01); *B65B 59/001* (2019.05); *B65G 47/32* (2013.01)

(58) Field of Classification Search
CPC ....... B65B 21/20; B65B 59/001; B65B 35/36; B65G 47/32
USPC .......................................................... 53/531
See application file for complete search history.

(56) References Cited

U.S. PATENT DOCUMENTS

| | | |
|---|---|---|
| 2,358,292 A | 9/1944 | Malhiot |
| 3,555,776 A | 1/1971 | Nigrelli et al. |
| 3,601,246 A | 8/1971 | Dubois |
| 3,815,320 A | 6/1974 | Ganz |

(Continued)

FOREIGN PATENT DOCUMENTS

| | | |
|---|---|---|
| BE | 1027586 B1 | 4/2021 |
| BR | PI0402495 B1 | 2/2016 |

(Continued)

OTHER PUBLICATIONS

ABB Robotics, "Picking and packing salami snacks," <https://www.youtube.com/watch?v=aPTd8XDZOEk> YouTube publication date Apr. 19, 2010.

(Continued)

*Primary Examiner* — Robert F Long
*Assistant Examiner* — Xavier A Madison
(74) *Attorney, Agent, or Firm* — ARENTFOX SCHIFF LLP

(57) ABSTRACT

The present invention provides a packaging apparatus for picking up a set of articles from a first conveying line and releasing into a package at a second conveying line, simultaneously.

15 Claims, 14 Drawing Sheets

(56) References Cited

U.S. PATENT DOCUMENTS

| | | | |
|---|---|---|---|
| 4,191,003 A | 3/1980 | Talarico | |
| 4,457,121 A | 7/1984 | Johnson et al. | |
| 4,641,742 A | 2/1987 | Igarashi et al. | |
| 5,011,126 A | 4/1991 | Suzuki et al. | |
| 5,237,468 A | 8/1993 | Ellis | |
| 5,261,520 A | 11/1993 | Duke | |
| 5,388,389 A | 2/1995 | Tisma | |
| 5,558,200 A | 9/1996 | Whitby et al. | |
| 5,588,282 A | 12/1996 | Hartness | |
| 5,607,045 A | 3/1997 | Hermann Kronseder | |
| 6,191,507 B1 | 2/2001 | Peltier et al. | |
| 6,201,203 B1 | 3/2001 | Tilles | |
| 6,209,710 B1 | 4/2001 | Mueller et al. | |
| 6,421,984 B1 | 7/2002 | Murgatroyd et al. | |
| 6,467,608 B2 | 10/2002 | Stauber | |
| 6,733,224 B1 | 5/2004 | Linner | |
| 6,811,019 B2 | 11/2004 | Christian et al. | |
| 6,848,566 B2 | 2/2005 | Harnish et al. | |
| 6,868,652 B2 | 3/2005 | Arends et al. | |
| 6,876,107 B2 | 4/2005 | Jacobs | |
| 6,904,733 B2 | 6/2005 | Boix Jaen | |
| 6,941,723 B2 * | 9/2005 | Di Stasio | B65B 21/18 53/247 |
| 7,093,408 B2 | 8/2006 | Duperray et al. | |
| 7,134,258 B2 | 11/2006 | Kalany et al. | |
| 7,146,784 B1 | 12/2006 | Portrait | |
| 7,153,085 B2 | 12/2006 | Clark et al. | |
| 7,309,203 B2 | 12/2007 | Clark et al. | |
| 7,310,925 B2 | 12/2007 | Monti | |
| 7,320,203 B2 | 1/2008 | Monti | |
| 7,392,630 B2 | 7/2008 | Ford | |
| 7,401,451 B2 | 7/2008 | Bennett | |
| 7,401,453 B2 | 7/2008 | Ford | |
| 7,461,838 B2 | 12/2008 | Hendricks et al. | |
| 7,543,424 B2 | 6/2009 | Lechner et al. | |
| 7,543,425 B2 | 6/2009 | Monti | |
| 7,549,276 B2 | 6/2009 | Monti | |
| 7,552,570 B2 | 6/2009 | Raudat et al. | |
| 7,631,474 B2 | 12/2009 | Ford | |
| 7,735,296 B2 | 6/2010 | Momich | |
| 7,779,606 B2 | 8/2010 | Ford | |
| 7,789,219 B2 | 9/2010 | Baldanza et al. | |
| 7,803,099 B2 | 9/2010 | Biraud et al. | |
| 7,806,250 B2 | 10/2010 | Ford | |
| 8,033,082 B2 | 10/2011 | Raudat et al. | |
| 8,096,409 B2 | 1/2012 | Wipf et al. | |
| 8,322,514 B2 | 12/2012 | Bonnain et al. | |
| 8,430,232 B2 | 4/2013 | Baldanza et al. | |
| 8,448,777 B2 | 5/2013 | Pazdernik | |
| 8,534,727 B2 | 9/2013 | Weclawski et al. | |
| 8,671,651 B2 | 3/2014 | Poutot | |
| 8,776,985 B2 | 7/2014 | Huettner et al. | |
| 8,777,552 B2 | 7/2014 | Ward et al. | |
| 8,876,182 B2 | 11/2014 | Eidelberg et al. | |
| 8,903,540 B2 | 12/2014 | Stork et al. | |
| 9,045,291 B2 | 6/2015 | Konrad et al. | |
| 9,061,838 B2 | 6/2015 | van de Loecht et al. | |
| 9,199,757 B2 | 12/2015 | Kolb | |
| 9,233,800 B2 | 1/2016 | Senn et al. | |
| 9,309,016 B2 | 4/2016 | Stork et al. | |
| 9,365,366 B2 | 6/2016 | Girtman | |
| 9,403,611 B2 | 8/2016 | Sacchetti et al. | |
| 9,533,785 B2 | 1/2017 | Rapp et al. | |
| 9,540,127 B2 * | 1/2017 | Papsdorf | B65G 47/082 |
| 9,546,049 B2 | 1/2017 | Lindauer | |
| 9,573,771 B2 | 2/2017 | Papsdorf et al. | |
| 9,580,253 B2 | 2/2017 | Papsdorf et al. | |
| 9,604,792 B2 | 3/2017 | Wipf | |
| 9,611,102 B2 | 4/2017 | Job et al. | |
| 9,637,256 B2 * | 5/2017 | Van Wickeren | B65B 27/04 |
| 9,725,197 B2 | 8/2017 | Pettersson et al. | |
| 9,731,854 B2 | 8/2017 | Mann et al. | |
| 9,796,495 B2 | 10/2017 | Boden et al. | |
| 9,802,507 B2 | 10/2017 | Clark | |
| 9,809,392 B2 | 11/2017 | Walter et al. | |
| 9,856,092 B2 | 1/2018 | Job et al. | |
| 9,873,571 B2 | 1/2018 | Hahn | |
| 9,938,031 B2 | 4/2018 | Shurtleff et al. | |
| 9,950,875 B2 | 4/2018 | Walter et al. | |
| 9,957,072 B2 | 5/2018 | Shurtleff et al. | |
| 9,963,258 B2 | 5/2018 | Rapp et al. | |
| 9,988,166 B2 | 6/2018 | Avril et al. | |
| 10,029,855 B2 | 7/2018 | Grosskreuz et al. | |
| 10,106,331 B2 | 10/2018 | Radak et al. | |
| 10,139,351 B2 | 11/2018 | Piana et al. | |
| 10,150,219 B2 | 12/2018 | Ridel et al. | |
| 10,161,970 B2 | 12/2018 | Sun et al. | |
| 10,246,266 B2 | 4/2019 | Weber et al. | |
| 10,287,105 B2 | 5/2019 | Hayashi et al. | |
| 10,407,195 B2 | 9/2019 | Sassi et al. | |
| 10,486,914 B2 | 11/2019 | Choplin | |
| 10,604,291 B2 | 3/2020 | Hutter et al. | |
| 10,669,049 B2 | 6/2020 | Eberhardt et al. | |
| 10,696,488 B2 | 6/2020 | Papsdorf et al. | |
| 10,717,606 B2 | 7/2020 | Papsdorf et al. | |
| 10,766,650 B2 | 9/2020 | Choplin et al. | |
| 10,773,847 B2 | 9/2020 | Bellante | |
| 10,829,255 B2 | 11/2020 | Aumann et al. | |
| 10,850,881 B2 | 12/2020 | Langen et al. | |
| 10,882,704 B2 | 1/2021 | Torrero | |
| 10,919,705 B2 | 2/2021 | Papsdorf et al. | |
| 11,001,400 B2 | 5/2021 | Kalany et al. | |
| 2001/0019006 A1 | 9/2001 | Stauber | |
| 2003/0015402 A1 | 1/2003 | Bennett | |
| 2003/0230941 A1 | 12/2003 | Jacobs | |
| 2004/0262127 A1 | 12/2004 | Harnish et al. | |
| 2005/0220582 A1 | 10/2005 | Kumagai et al. | |
| 2006/0207220 A1 | 9/2006 | Ford | |
| 2007/0119123 A1 | 5/2007 | Clark et al. | |
| 2007/0152458 A1 | 7/2007 | Guidetti | |
| 2008/0000756 A1 | 1/2008 | Behnke et al. | |
| 2008/0196362 A1 | 8/2008 | Monti | |
| 2008/0283361 A1 | 11/2008 | Martini et al. | |
| 2009/0229227 A1 | 9/2009 | Raudat et al. | |
| 2010/0084247 A1 | 4/2010 | Wipf et al. | |
| 2010/0140052 A1 | 6/2010 | Martini | |
| 2010/0192515 A1 | 8/2010 | Chalendar et al. | |
| 2011/0150610 A1 | 6/2011 | Weber | |
| 2011/0154784 A1 | 6/2011 | Poutot | |
| 2011/0173930 A1 | 7/2011 | Poutot | |
| 2012/0085623 A1 | 4/2012 | Wipf | |
| 2012/0261233 A1 | 10/2012 | Huettner et al. | |
| 2014/0262685 A1 | 9/2014 | Job et al. | |
| 2014/0299445 A1 | 10/2014 | Kolb | |
| 2014/0377049 A1 | 12/2014 | Girtman | |
| 2015/0001041 A1 | 1/2015 | Barber et al. | |
| 2015/0063963 A1 | 3/2015 | Kinugawa | |
| 2015/0090404 A1 | 4/2015 | Van Wickeren et al. | |
| 2015/0139772 A1 | 5/2015 | Rapp et al. | |
| 2015/0158611 A1 | 6/2015 | Kalany et al. | |
| 2015/0321857 A1 | 11/2015 | Sacchetti et al. | |
| 2016/0068290 A1 | 3/2016 | Bonnain et al. | |
| 2016/0107782 A1 | 4/2016 | Hutter et al. | |
| 2018/0186579 A1 | 7/2018 | Choplin | |
| 2018/0222608 A1 | 8/2018 | Hutter et al. | |
| 2019/0233151 A1 | 8/2019 | Ford et al. | |
| 2019/0255698 A1 | 8/2019 | Zeiner et al. | |
| 2019/0367288 A1 | 12/2019 | Papsdorf et al. | |
| 2020/0189779 A1 | 6/2020 | Canalicchio et al. | |
| 2020/0290815 A1 | 9/2020 | Papsdorf et al. | |
| 2020/0290816 A1 | 9/2020 | Papsdorf et al. | |
| 2021/0139176 A1 | 5/2021 | Bonnain | |
| 2021/0229847 A1 | 7/2021 | Kalany et al. | |

FOREIGN PATENT DOCUMENTS

| | | |
|---|---|---|
| BR | PI0923133 B1 | 6/2019 |
| BR | 112019015965 A2 | 3/2020 |
| CN | 1735548 A | 2/2006 |
| CN | 102171114 A | 8/2011 |
| CN | 202729327 U | 2/2013 |
| CN | 103921981 A | 7/2014 |
| CN | 108674883 A | 10/2018 |
| CN | 208216241 U | 12/2018 |

(56) References Cited

FOREIGN PATENT DOCUMENTS

| | | |
|---|---|---|
| CN | 109421950 A | 3/2019 |
| CN | 108454224 B | 6/2020 |
| DE | 1236531 B | 3/1967 |
| DE | 3709046 C1 | 10/1988 |
| DE | 4208818 A1 | 9/1993 |
| DE | 19602358 C1 | 3/1997 |
| DE | 19628563 A1 | 1/1998 |
| DE | 10121038 A1 | 10/2002 |
| DE | 10346415 A1 | 5/2005 |
| DE | 202005006755 U1 | 10/2005 |
| DE | 102004026455 A1 | 12/2005 |
| DE | 102005014863 A1 | 10/2006 |
| DE | 202010001712 U1 | 6/2011 |
| DE | 102010018153 A1 | 10/2011 |
| DE | 202012000938 U1 | 3/2012 |
| DE | 102011016855 A1 | 10/2012 |
| DE | 102011076864 A1 | 12/2012 |
| DE | 102011015741 B4 | 1/2013 |
| DE | 102011081705 A1 | 2/2013 |
| DE | 102011083377 A1 | 3/2013 |
| DE | 102011085724 A1 | 5/2013 |
| DE | 202013105022 U1 | 2/2014 |
| DE | 102014105998 A1 | 2/2015 |
| DE | 102013111088 A1 | 4/2015 |
| DE | 102014103632 A1 | 9/2015 |
| DE | 102015203412 A1 | 9/2015 |
| DE | 102015114654 A1 | 3/2017 |
| DE | 102016211169 A1 | 12/2017 |
| DE | 102016212227 A1 | 1/2018 |
| DE | 102016212237 A1 | 1/2018 |
| DE | 102016121361 A1 | 5/2018 |
| DE | 202018103487 U1 | 8/2018 |
| DE | 102016105570 B4 | 1/2019 |
| DE | 102019107313 A1 | 9/2020 |
| DE | 102020107427 A1 | 9/2020 |
| DE | 102019204393 A1 | 10/2020 |
| DE | 102019115198 A1 | 12/2020 |
| EP | 0439741 A1 | 8/1991 |
| EP | 0496046 B1 | 1/1995 |
| EP | 0813494 B1 | 9/1999 |
| EP | 1231145 A1 | 8/2002 |
| EP | 1123886 B1 | 8/2004 |
| EP | 1522402 B1 | 6/2006 |
| EP | 1327591 B1 | 11/2006 |
| EP | 1790593 A1 | 5/2007 |
| EP | 1067048 B1 | 8/2008 |
| EP | 2014559 A1 | 1/2009 |
| EP | 1803665 B1 | 5/2009 |
| EP | 1530541 B1 | 7/2009 |
| EP | 1645340 B1 | 10/2010 |
| EP | 2192063 B1 | 4/2012 |
| EP | 2411307 B1 | 6/2012 |
| EP | 2338795 B1 | 10/2012 |
| EP | 2757043 A1 | 7/2014 |
| EP | 2673224 B1 | 1/2015 |
| EP | 2560904 B1 | 4/2015 |
| EP | 2484611 B1 | 9/2015 |
| EP | 2500296 B1 | 2/2016 |
| EP | 2634100 B1 | 2/2016 |
| EP | 2921433 B1 | 9/2016 |
| EP | 3105017 A1 | 12/2016 |
| EP | 3034415 B1 | 3/2017 |
| EP | 3034441 B1 | 4/2017 |
| EP | 3024737 B1 | 7/2017 |
| EP | 2980010 B1 | 8/2017 |
| EP | 2861496 B1 | 9/2017 |
| EP | 3022138 B1 | 10/2017 |
| EP | 3038959 B1 | 11/2017 |
| EP | 2848382 B1 | 12/2017 |
| EP | 2736834 B1 | 2/2018 |
| EP | 3003927 B1 | 3/2018 |
| EP | 3266718 B1 | 7/2018 |
| EP | 3317186 B1 | 7/2019 |
| EP | 3109998 B1 | 8/2019 |
| EP | 3577046 A1 | 12/2019 |
| EP | 3363751 B1 | 4/2020 |
| EP | 3659932 A2 | 6/2020 |
| EP | 3405395 B1 | 7/2020 |
| EP | 3181495 B1 | 11/2020 |
| EP | 3251986 B1 | 1/2021 |
| EP | 3778439 A1 | 2/2021 |
| EP | 3230181 B2 | 7/2021 |
| EP | 3422562 B1 | 10/2021 |
| FR | 3088842 A1 | 5/2020 |
| GB | 0703364 A | 2/1954 |
| GB | 1340427 A | 12/1973 |
| GB | 2434356 A | 7/2007 |
| IT | BO990370 A1 | 1/2001 |
| IT | BO990484 A1 | 3/2001 |
| JP | S54128282 U | 9/1979 |
| JP | S6277149 U | 5/1987 |
| JP | H05254644 A | 10/1993 |
| JP | H08-119451 A | 5/1996 |
| JP | 2011025392 A | 2/2011 |
| JP | 2018184294 A | 11/2018 |
| WO | WO99036317 A2 | 7/1999 |
| WO | WO00068087 A2 | 11/2000 |
| WO | WO01085581 A1 | 11/2001 |
| WO | WO2004024401 A1 | 3/2004 |
| WO | WO2005070768 A1 | 8/2005 |
| WO | WO2006098556 A1 | 9/2006 |
| WO | WO2007033267 A2 | 3/2007 |
| WO | WO2008036754 A2 | 3/2008 |
| WO | WO2010120869 A1 | 10/2010 |
| WO | WO2011127367 A1 | 10/2011 |
| WO | WO2011138448 A1 | 11/2011 |
| WO | WO2012057996 A2 | 5/2012 |
| WO | WO2013005120 A1 | 1/2013 |
| WO | WO2013185954 A1 | 12/2013 |
| WO | WO2014072518 A2 | 5/2014 |
| WO | WO2014118631 A1 | 8/2014 |
| WO | WO2014187543 A1 | 11/2014 |
| WO | WO2015101862 A1 | 7/2015 |
| WO | WO2016012158 A1 | 1/2016 |
| WO | WO2016012159 A1 | 1/2016 |
| WO | WO2016069190 A1 | 5/2016 |
| WO | WO2016069457 A1 | 5/2016 |
| WO | WO2016146213 A1 | 9/2016 |
| WO | WO2016188843 A1 | 12/2016 |
| WO | WO2016200753 A1 | 12/2016 |
| WO | WO2017167421 A1 | 10/2017 |
| WO | WO2018049125 A1 | 3/2018 |
| WO | WO2018144552 A1 | 8/2018 |
| WO | WO2018145214 A1 | 8/2018 |
| WO | WO2018161160 A1 | 9/2018 |
| WO | WO2018193218 A1 | 10/2018 |
| WO | WO2019007923 A1 | 1/2019 |
| WO | WO2019129968 A1 | 7/2019 |
| WO | WO2020126218 A1 | 6/2020 |
| WO | WO2020146486 A1 | 7/2020 |
| WO | WO2020244951 A1 | 12/2020 |

OTHER PUBLICATIONS

All Packaging Company, "Folding Carton continuous printing at up to 20k sheets per hour," <https://www.youtube.com/watch?v=Bc8ZnHukvN0> YouTube publication date Mar. 3, 2013.

Bastian Solutions, "High-Speed Pick & Place Robots by Basitan Solutions," <https://www.youtube.com/watch?v=6RKXVefE98w> YouTube publication date Apr. 3, 2012.

BluePrint Automation, "20237 BluePrint Automation (BPA) Robotic Pick & Place Case Packer (Model: Robotic Top Loader," <https://www.youtube.com/watch?v=RjxTeuyaH_Q> YouTube publication date Apr. 13, 2012.

Bobst, "Bobst Ambition folder-gluers," <https://www.youtube.com/watch?v=EvLkFkz-Uv0> YouTube publication date Jan. 29, 2015.

Packagingspace, "Cama Group complete packaging lineup.mpg," <https://www.youtube.com/watch?v=6uTnz59b4H8> YouTube publication date May 16, 2011.

Packfeeder, "Robotic bottle unscrambler—Pickfeeder Twin 200," <https://www.youtube.com/watch?v=ueiOqVip7-c> YouTube publication date Dec. 11, 2018.

(56) References Cited

OTHER PUBLICATIONS

Professional Packaging Systems, "A-B-C 450 High Speed Case Erector and Bottom Sealer / ProPac.com," <https://www.youtube.com/watch?v=w6w9psSstKA> YouTube publication date Sep. 3, 2010.
STAX Technologies, "Case packer + palletizer," <https://www.youtube.com/watch?v=YtNft4FYkDw> YouTube publication date May 6, 2015.
International Search Report and Written Opinion for Application No. PCT/EP2020/071497 dated Nov. 5, 2020 (9 pages).
International Preliminary Report on Patentability for Application No. PCT/EP2020/071497 dated Feb. 10, 2022 (8 pages).
Extended European Search Report received for EP Patent Application No. 19219856.2, mailed on Apr. 2, 2020, 8 pages.
International Search Report and Written Opinion received for PCT Patent Application No. PCT/EP2020/071497, mailed on Nov. 5, 2020, 11 pages.
Lu, Zhibin, "A solution for lane changing and docking of packaging machinery conveyor lines case", China Packaging Industry, Mar. 20, 2016, 9 pages.
Office Action received for Chinese Patent Application No. 202080068214.6, mailed on Dec. 14, 2023, 12 pages (4 pages of English Translation and 8 pages of Original Document).
Zhou, L. et al., "Automatic Glass Cup packaging machine and assembly line balance control", A Packaging Engineering, vol. 23, Dec. 10, 2017, 11 pages.

\* cited by examiner

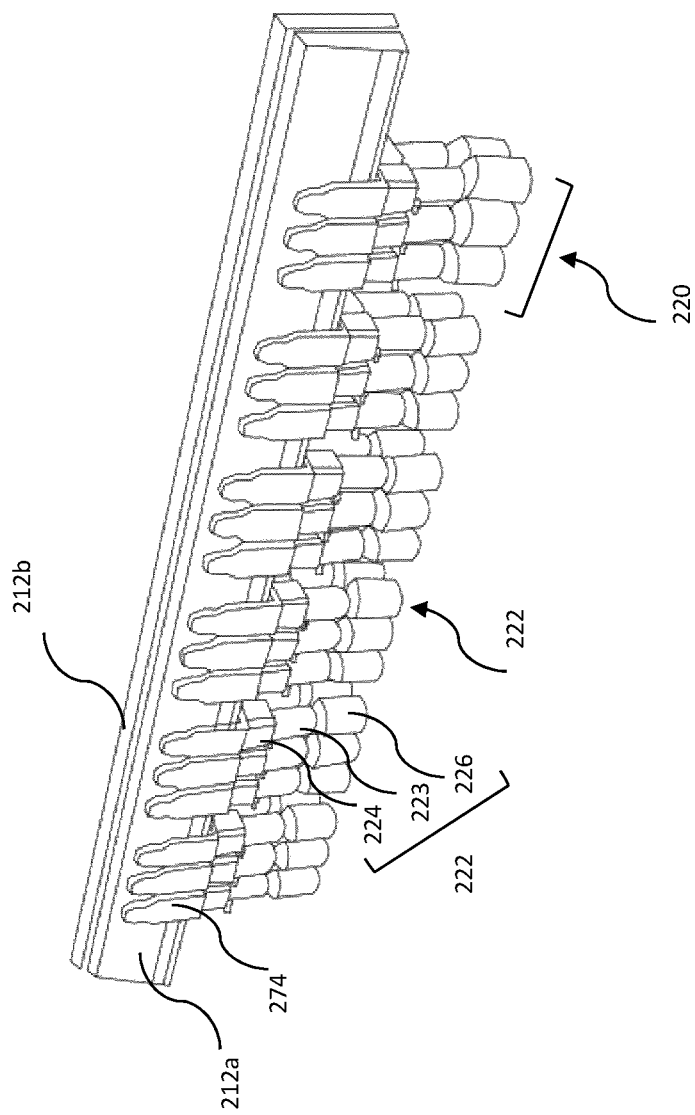

PACKAGING APPARATUS

CROSS REFERENCE TO RELATED APPLICATIONS

This application is a national stage filing under 35 U.S.C. § 371 of International Patent Application No.: PCT/EP2020/071497, filed Jul. 30, 2020, which claims priority to European Patent Application No. 19189041.7, filed Jul. 30, 2019, and European Patent Application No. 19219856.2, filed Dec. 27, 2019, the entire contents of which all are hereby incorporated by reference herein.

TECHNICAL FIELD

The present invention generally relates to a packaging apparatus and more particularly relates to a packaging apparatus for packaging items, objects or articles.

BACKGROUND

In the recent years, there has been a many-fold increase in the trend of grouping large number of items such as e.g. food items, including liquid foods, home essentials, stationary items, beverage containers, and the like, in (secondary) packages, for various purposes such as to enable bulk selling, easy transportation, handling, and the like.

Generally, the packaging of articles such as e.g. beverage containers inside so called secondary packages involves multiple steps including receiving incoming beverage containers from one or more in-feeds, picking up, releasing and dropping the beverage containers within the packages and then closing the packages.

Accordingly, numerous attempts have been made to develop improved systems for picking up articles such as beverage containers from a conveyor system and depositing them within a secondary package, such as e.g. a corrugated cardboard box, with high speed and accuracy.

Conventionally, this task of moving articles from an article feed conveyor into open receptacles, such as for example cardboard boxes, is achieved by means of effectors and/or manipulators, which may also take the form of robots or automatons. One such robotic arm is disclosed in U.S. Pat. No. 5,060,455 ("Robotic Case Packaging System and Method"), the contents of which are hereby incorporated by reference. Further, some high-speed robotic arms as one disclosed in U.S. Pat. No. 4,976,582 are also utilized.

However, such conventional robotic transfer mechanisms are often not able to accommodate high speed handling because of the use of multiple feed lines: one supplying the e.g. beverage containers and another supplying open packages.

Furthermore, transfer mechanisms must be adjusted to manage a "pitch" between individual articles, article groupings and/or packages. Pitch is generally defined as a central distance between two consecutive articles or items, whatever the items are. Currently, this pitch is set and monitored by using multi-axes robots capable of line-tracking the articles, items or (box-shaped) packages. The loading follows a pre-determined grouping of articles to be packed, corresponding to a certain number of units of articles or products per packages (e.g. box). Further, some variable-pitch pick and place devices have been developed, such as the device disclosed in U.S. Pat. No. 5,290,134, to provide the capability of simultaneous pick-up and deposit even where the pitch of one feed may differ from that of another feed. However, such in-line tracking and variable pick-up mechanisms adjustment requires a lot of calculations and analysis, and within a constant changing environment, it is a considerable challenge.

Additionally, the currently known systems are accommodated to transfer a predetermined group of articles having a predetermined fixed shape, configuration, size, or number in a fixed size package. If however, there is a need to switch to a different configuration, package size or other, these robotic arms and other currently known machines require a manual adjustment. During this manual change over period, which can be thirty minutes or more, a machine cannot be used (known as "down time"), which is an expensive delay in any plant.

Accordingly, as can be understood from the foregoing discussion, none of the existing solutions completely provide the flexibility of using a same packaging machine to handle varying configurations, shapes and pitches during an intermittent or continuous packaging operation of articles in a (secondary) package. Thus, in the context of the above, an improved packaging apparatus is desired which, while being cost effective and easy to implement, allows to carry out packaging even with varying pitches, shapes, sizes, arrangements, and the like without needing interchanging elements and components.

SUMMARY

In one aspect of the invention, a packaging apparatus is provided for picking up a set of articles, such as e.g. beverage containers, from a first conveying line and releasing the articles into a package at a second conveying line, simultaneously. The packaging apparatus includes a central packaging frame extending between a first conveying line at a first end and a second conveying line at a second end. The central packaging frame includes a pair of transversally directed spaced apart generally parallel central tracks, namely a first central track and a second central track. Each of the central tracks includes a top rail connected to a bottom rail through a central body portion. The central packaging frame further includes a plurality of pairs of outer rails, one configured at each end of each of the pair of central tracks. Each of the outer rails is adapted to move up and down so as to optionally connect to one of the top rails and/or the bottom rails of the central track and define respectively a top path and a bottom path there through. The packaging apparatus further includes a plurality of support means extending longitudinally between the spaced apart central tracks. Each of the support means includes one or more gripper sets having a plurality of gripping heads arranged in a predetermined configuration, movingly supported thereon. Furthermore, the packaging apparatus includes a vertical movement mechanism for enabling a vertically upward and/or a downward movement of each of the outer rails independently between a top position and a bottom position. The packaging apparatus additionally includes a horizontal movement mechanism for moving each of the support means along at least one of the top and/or bottom path between the first end and the second end. In operation the upward and/or the downward movement of each of the outer rails and the horizontal movement of each of the support means is synchronized in such a way that the gripper sets on at least one of the support means is adapted to pick up a set of articles, such as e.g. beverage containers, from the first conveying line at the first end, and the gripper sets on at least one other support means is adapted to release already picked up beverage containers into a secondary package at the second conveying line at the second end, simultaneously.

Potentially, the support means include one or more support rails extending longitudinally and generally perpendicularly between the first central track and the second central track and is configured to carry one or more gripper sets thereupon.

Further potentially, the horizontal movement mechanism includes one or more pairs of support movers engaging each of the support means at its opposite ends and movingly configured onto the pair of central tracks and the corresponding connected outer rails.

Furthermore potentially, each of the support rails include a combination of one or more parallel rails, each adapted to hold a row of gripper heads of the one or more gripper sets.

Yet further potentially, the packaging apparatus includes a gripper moving mechanism for longitudinally moving the one or more gripper sets and/or gripper heads towards and/or away from each other, onto the corresponding support rails.

Possibly, the gripper moving mechanism includes a plurality of gripping movers movingly configured onto the support means, each of the gripping movers adapted to movingly engage one of the gripping head therewith.

Generally, the vertical movement mechanism includes a rail moving slot at each end of the pair of central tracks throughout its central body portion such that the corresponding outer rail is slidably movable there through between its top position and the bottom position.

In an embodiment, as illustrated in FIG. 7, the vertical movement mechanism may comprise a vertical transportation unit 701, for example a belt, at each end of the pair of central tracks, onto which one or preferably more corresponding outer rails 268 are fixed. The vertical movement of these vertical transportation units results in a vertical movement of the one or more corresponding outer rails. Preferably, the vertical transportation units are closed loop units, for example a rotary belt, enabling a continuous vertical rotary movement of the one or more corresponding outer rails at each end of the pair of central tracks, and thereby enabling continuous motion of the support means 212.

Optionally, each of the plurality of support rails is movable in a widthwise direction and each of the gripping heads is movable within a length wise direction such that the gripper set having a desired configuration of the gripping heads may be achieved.

Further optionally, each gripper-set of the plurality of gripper sets has a varying pitch adjustable on the basis of one or more factors selected from, but not limited to, difference in speed of conveying lines, difference between pitch of packages, arrangement of articles, and the like.

Possibly, in the case of the articles being beverage containers, the gripping head may include a gripper body extending towards a downwardly protruding beverage container head adapted to selectively perform an operation selected from pick up and/or release operation. In such case, the gripping head may be an electric tulip gripper, optionally equipped with built-in sensors such as for example a closure sensor and/or a container presence sensor.

Optionally, in the case of the articles being beverage containers (Cans or Bottles), each of the gripping heads may include a container orienting mechanism adapted to orient the beverage container in a desired orientation and possibly being capable of spinning the container through >360°.

Further optionally, in the case of the articles being beverage containers, the container orienting mechanism may be selected from one or more of, but not limited to, any suitable conventional rotating mechanism such as a rotational servo, stepper or permanent magnet motor. The motor may further more be integrated into the body of the gripping mover such that a compact, light weight assembly is realized.

In a preferred embodiment, article rotation to spin or otherwise rotate the article may be realized via a motor mounted within and fully integrated with the body of the gripping mover, preferably with angular position sensing encoder. Further more, spin or rotation is powered and controlled by wireless, contactless inductive power supply/s and controlled also by the wireless machine automation. The system including appropriate wireless feedback sensing likewise via a two-way wireless machine automation and control system, powered by a slide power supply or contactless, wireless inductive power supply system/s, all of which enable untethered freedom of far ranging yet controlled motion and operation. The motor may be a stepper, permanent magnet, servo motor or the like suitably powerful and controllable for the duty and small enough to fit.

In a preferred embodiment, the gripping head is an electrically activated tulip optionally complete with container presence and container closure presence sensing along with optional solenoid activation sensing. The electric tulip is realized via the said wireless machine control and either the slide power supply or contactless, wireless power supply, all of which enable untethered freedom of far ranging yet controlled motion and operation.

Generally, the first conveying line may be an output line of an article manufacturing unit having one or more means for grouping and/or arranging the articles in a predetermined configuration.

Further, the second conveying line may be an output line of a package forming unit.

Possibly, the package is an already formed top open box having one or more side flaps for facilitating a closure thereof.

Further possibly, the package is formed of a foldable blank of a material selected from one or more of, but not limited to, carton paper board, corrugated paper board, thermoplastic, hybrid material, laminated board and the like.

The packaging apparatus of the present invention may be provided with a guiding unit for facilitating the release of the articles in the package such that closure of the package is prevented during the release operation. The guiding unit includes an overhead frame formed of at least two spaced apart generally parallel longitudinal tracks and at least two spaced apart generally parallel transverse tracks. Each of the longitudinal tracks is horizontally movable towards and away from each other using a track movement mechanism. The guiding unit further includes one or more pairs of generally opposite movable guiding means configured onto the parallel longitudinal tracks. Each of the guiding means is of predetermined shape adapted to conform to at least an inner side wall or corner of the package such that when in contact with the side-wall, a closure of a side-flap extending there-through is prevented. In operation, when the gripper set is performing the release operation, an upward and/or downward movement of the overhead frame in the vertical direction and the movement of each of the guiding unit in horizontal direction is optimized in such a way that the each of the pair of guiding means is adapted to receive one of the gripper set there through within the package. Further, the pair of guiding means conforms to the inner sidewalls of package thereby keeping the package in an opened state during the release operation.

Potentially, the guiding unit includes a plurality of guiding movers movingly configured onto the longitudinal tracks, each of the guiding movers adapted to movingly engage one of the guiding means on the longitudinal rails.

Possibly, the packaging apparatus further includes a control unit for optimizing the movement of the outer rails and/or support means and/or gripper sets and operation of other components and elements of the apparatus.

Further possibly, the control unit includes one or more sensors, one or more input units, a processor unit and an output unit.

Possibly, the track movement mechanism includes one of more pairs of engaging members, each pair of the engaging members adapted to engage one of the longitudinal tracks at its opposite ends.

Further possibly, the track movement mechanism includes a plurality of track movers movingly configured onto the transversal tracks, each of the track movers adapted to movingly engage one of the engaging members thereupon, thereby enabling a horizontal movement of the longitudinal rails along the transverse rails.

Possibly, the packaging apparatus includes a first powering means for enabling a vertical movement of the one or more outer rails, wherein the said first powering means is selected from one or more of, but not limited to, linear motors, servo motors and synchronic and/or asynchronic motor drives.

Further possibly, the packaging apparatus includes a second powering means for powering the plurality of movers including gripping movers, support movers, guiding movers, and the track movers wherein the second powering means is selected from one or more of, but not limited to, linear motors, servo motors and synchronic and/or asynchronic motor drives.

Generally, the first powering means may be same as the second powering means and is selected as a linear motor or any other type of independent motion controlled driving means. In the case of the linear motor using the sliders as rotors and the corresponding tracks as stator thereof.

In a particular embodiment of the present invention, as illustrated in FIG. 7, with regards to the horizontal movement mechanism of the support means, the second powering mechanism may comprise motors 702, preferably geared motors. These motors may be preferably configured onto the support means 212 and wirelessly powered, and more preferably wirelessly controlled as well, in order to enable a continuous independent movement of each support means driven by respective motors configured at its opposite ends.

Alternatively, the horizontal movement mechanism of the support means may be powered by a pushing or pulling driving mechanism engaging onto the support means enabling pulling or pushing the support means horizontally from an outer rail over a central rail towards another outer rail. Such pulling or pushing driving mechanism may be for example a motion controlle integrated linear thrusters based mechanism, a rack and pinion mechanism or a drive roller/s and position sensing mechanism.

In an embodiment of the present invention, the gripper sets and/or the gripping heads may be wirelessly powered, for example via sliding contacts on the gripping movers, or preferably contactless powered, for example by providing inductive power to the gripping movers. Further, the gripper sets and/or the gripping heads may be wirelessly controlled, including but not limited to short range wireless, such as Bluetooth, Infrared, Microwave, or narrow through broad band telecommunication, WLAN, protocols and the like, preferably in combination with wirelessly powering. Wireless automation and control and wireless power supplies to realize synchronized, highly flexible, large range picking and dropping operations, even while the articles are in transit.

In yet another aspect of the invention, a method of packaging a plurality of articles from a first conveying line in a package at a second conveying line, is disclosed. The method includes receiving a continuous or intermittent supply of articles, such as e.g. already filled beverage containers, at a first conveying line. The method further includes grouping the articles at the first conveying line in a predetermined configuration and/or arrangement. Furthermore, the method includes receiving a continuous supply of packages at a second conveying line. The method further includes optimizing a vertical movement of each of the outer rails and the horizontal movement of each of the support means through the top and/or the bottom path such that the gripper sets on the at least one of the support means is adapted to pick up a set of articles from the first conveying line, while the gripper set on at least one other support means is adapted to release the already picked up beverage containers into one of the packages at the second conveying line, simultaneously.

Further, the method includes an optional step of optimizing the movement of guiding means so as to keep the package open during the article release operation.

Possibly, the optimization of the movement of the outer rails, the support means, the gripper sets and the guiding means is performed by a control unit on the basis of an input from a user and/or input from one or more sensors.

Other aspects, features and advantages of the subject matter disclosed herein will be apparent from the description, the drawings, and the claims.

BRIEF DESCRIPTION OF THE DRAWINGS

FIG. 4b illustrates an exemplary support means, in accordance with another embodiment of the present invention;

DETAILED DESCRIPTION

Specific structural and functional details disclosed herein are not to be interpreted as limiting, but merely as a basis for the claims and as a representative basis for teaching one skilled in the art to variously employ the present invention in virtually any appropriately detailed structure. It is to be understood that each specific portion includes all technical equivalents that operate in a similar manner to accomplish a similar purpose.

The present application discloses a packaging apparatus, for packaging a supply of articles such as e.g. already filled beverage containers (PET, HDPE, Aluminum Glass: Cans and Bottles) enclosing liquids such as cold drinks, beer, wines, mineral water etc., received statically or dynamically at one or more generally parallel first conveying line/s, dynamically into a supply of secondary packages received statically or dynamically at a second conveying line. The packaging apparatus while being efficient, is able to accommodate speed differences between the first and second conveying lines, while releasing a variable or predetermined configuration of articles at the first conveying line in a range of format groupings (rows & columns) of the packages at the second conveying line, without requiring any changes in the functional elements of the packaging apparatus. While the (secondary) package within the current disclosure is generally described in the context of holding beverage bottles, it should be understood that the embodiments of the present invention may be applied in combination with various types of packaged goods irrespective of size, shape and materials. It must also be noted that, as used in this specification and the appended claims, the singular forms "a," "an" and "the" include plural referents unless the context clearly dictates otherwise. Thus, for example, the term "an opening" is intended to mean a single opening or a combination of openings, "a sidewall" is intended to mean one or more sidewalls, or a combination thereof.

Figure 1:
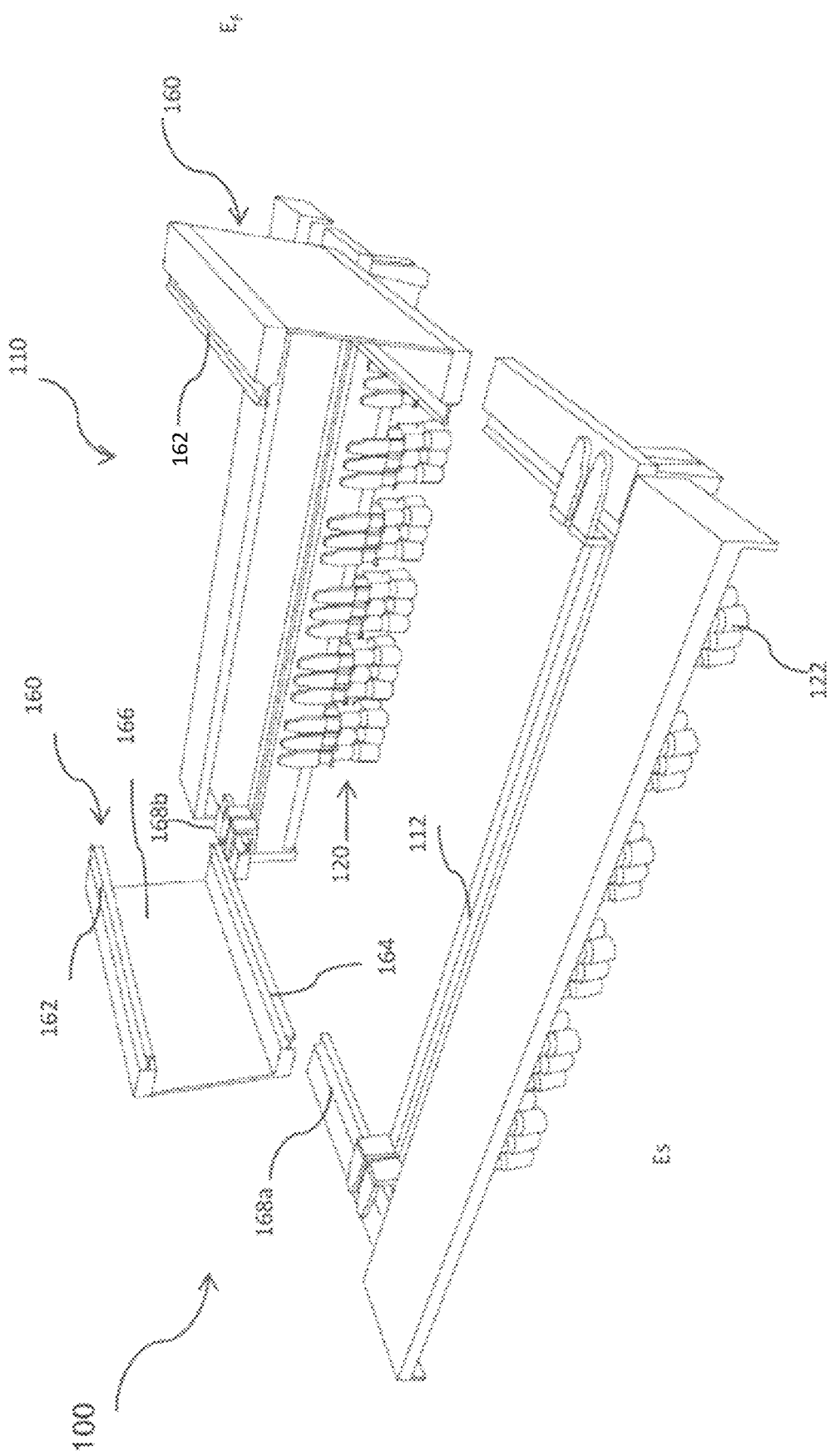
FIG. 1 illustrates schematic diagram representing a packaging apparatus, in accordance with a preferred embodiment of the present invention.

As illustrated in FIG. 1, the present invention provides a packaging apparatus 100 for packaging a supply of articles such as beverage containers (not shown) statically or dynamically received at one or more, generally parallel first conveying line/s, within a supply of secondary packages (not shown) received at a second conveying line. The packaging apparatus 100 includes a central packaging frame 110 extending between the one or more first conveying line/s at a first end $E_F$ and the second conveying line at a second end $E_S$. The central packaging frame 110 includes a pair of transversally directed spaced apart generally parallel central tracks 160. Each of the central tracks 160 include a transversally directed top rail 162 extending vertically away from a transversally directed bottom rail 164 through a central body portion 166. The central packaging frame 110 further includes a pair of outer rails 168a, 168b, positioned besides each of the pair of central tracks 160. A first outer rail 168a is positioned towards a first end $E_F$ and the second outer rail 168b is positioned towards a second end $E_S$, and adapted to move vertically upwards and downward so as to optionally connect to one of the top rails 162 and/or the bottom rails 164 of each of the central tracks 160 and as such define respectively a top path and a bottom path. The packaging apparatus 100 further includes one or more support means 112, generally perpendicular to the central tracks 160, and extending longitudinally there between. The one or more support means 112 are adapted to move horizontally onto the packaging frame 110 between the first end $E_F$ at the first conveying line and the second end $E_S$ towards the second conveying line. The packaging apparatus 100 further includes a plurality of gripper sets 120 movingly supported onto the support means 112 such that at least one of the gripper sets 120 is supported onto each of the support means 112. The gripper sets 120 include a plurality of individual gripping heads 122 arranged in a predetermined configuration and movingly supported onto the support means 112. The packaging apparatus 100 further includes a vertical movement mechanism (not shown) for moving the outer rails 168 in a vertically upward and/or downward direction, and a horizontal movement mechanism (not shown) for horizontally moving the support means 112 between the first end $E_F$ and the second end $E_S$. Further, each of the gripper sets 120 is adapted to perform an operation selected from static or dynamic (while the articles are in transit) pickup operation for picking up the articles from the one or more first conveying line/s and/or static or dynamic (while the packages are in transit) release operation for releasing the already picked up articles within one of the secondary packages at the second conveying line. In operation, the vertical movement of the outer rails 168, and the horizontal movement of the plurality of the support means 112, and therefore the gripper sets 120 between the first end $E_F$ and the second end $E_S$, is synchronized in such a way that the gripper sets 120 on at least one of the support means 112 is adapted to pick up a set of articles from the first one or more conveying line/s and another gripper set 120 on at least one other support means 112 is adapted to release an already picked up set of articles into one of the packages at the second conveying line, simultaneously.

Figure 2A:
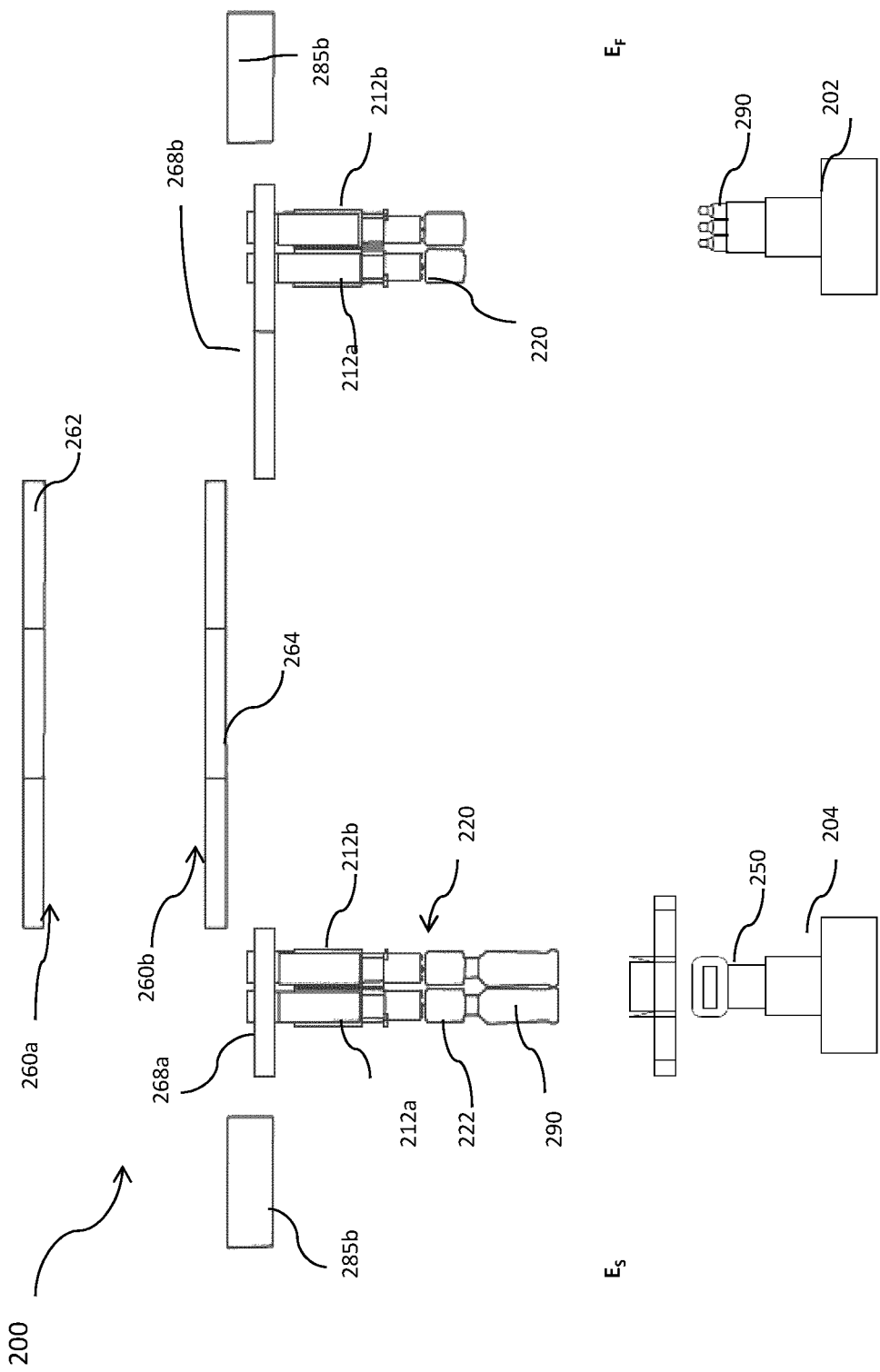
FIG. 2a illustrates a front view diagram representing a packaging apparatus configured between a first conveying line and a second conveying line, in accordance with an embodiment of the present invention.
Figure 2B:
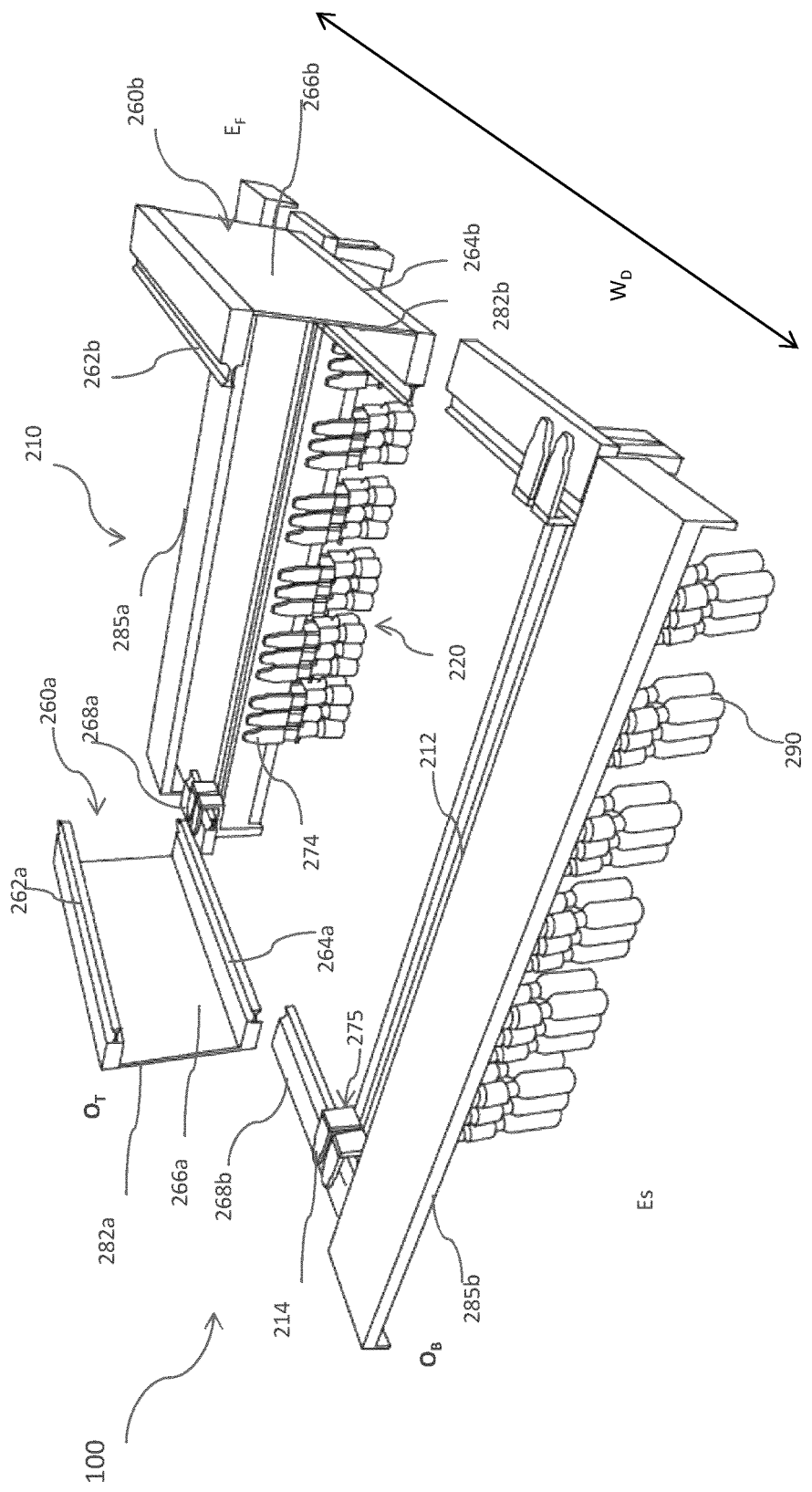
FIG. 2b illustrates a schematic diagram representing a packaging apparatus, in accordance with an embodiment of the present invention.

FIGS. 2a and 2b illustrate an exemplary packaging apparatus 200 adapted to dynamically pick up beverage containers 290 of a given or random pitch from one or more first conveying line/s 202 and dynamically releasing in a package 250 in the required collation of rows and columns forming the format, at a second conveying line 204 carrying a feed of already formed top and/or side opened packages 250. In another embodiment, the plurality of beverage containers 290 at the first conveying line 202 includes a grouping means (not shown) for grouping the beverage containers 290 in a predetermined arrangement. The grouping means may include any conventional grouping mechanism suitable for grouping and arranging the beverage containers at an outfeed of a conveying line. Alternatively, the beverage containers (or articles) may be randomly supplied in pressureless single file via one or more generally parallel infeed conveyors and upon being dynamically picked up are re-pitched and collated into the desired package formats (rows & columns) and the so grouped formats further re-pitched and dynamically delivered into/onto the secondary packaging at the second conveying line.

As disclosed earlier and with reference to FIG. 2a, the packaging apparatus 200 includes a central packaging frame 210 extending between the first conveying line 202 at a first end $E_F$ and a second conveying line 204 at a second end $E_S$. The central packaging frame 210 includes a pair of transversally directed spaced apart generally parallel central tracks 260, including a first central track 260a and a second central track 260b. Each of the central tracks 260a, 260b include a transversally directed top rail 262a, 262b respectively extending vertically away from a corresponding transversally directed bottom rail 264a, 264b through a central body portion 266a, 266b respectively.

The central packaging frame 210 further includes a plurality of pairs of outer rails 268, each positioned along with each of the pair of central tracks 260a, 260b. The pair of outer rails 268 includes a first outer rail 268a positioned towards the first end $E_F$ and a second outer rail 268b positioned towards the second end $E_S$, each adapted to move vertically upwards and downward so as to optionally connect to one of the top rails 262a, 262b of the pair of central tracks 260a, 260b respectively, and/or to the bottom rails 264a, 264b of the central tracks 260a, 260b respectively, and defines a top path T and a bottom path B there through.

In preferred embodiments, the vertically upward and/or downward movement of the each of the plurality of outer rails 268 is obtained by utilizing a vertical movement mechanism. In some instances, the vertical movement mechanism includes a rail receiving slot 282a and 282b at each the pair of central tracks 260 throughout its corresponding body portion 266. The receiving slots 282a, 282b are configured to receive the corresponding outer rails 268a, 268b and adapted to move up and down between a top position $O_T$ and a bottom position $O_B$ such that when engaged with the top rail 262, the top path T is formed and when engaged with the bottom rail 264, the bottom path B is formed. In other embodiments, of the present invention, any suitable and conventionally known vertical movement mechanism may be utilized for the selective movement of each of the outer rails 268 between the top position $O_T$ and the bottom position $O_B$.

The packaging apparatus 200 further includes a pair of generally longitudinal outer support platforms 285, including a first support platform 285a at the first end $E_F$ and a second support platform 285b at the second end $E_S$ configured generally perpendicularly to the central packaging frame 210. Each of the outer support platforms 285a, 285b is a support body positioned at a height H from a ground level sufficient to perform the pickup and/or the release operation. Further, each of the outer support platforms 285a, 285b is adapted to support the corresponding outer rails 268 at its bottom position $O_B$ such that while performing pickup and/or release operation, the outer rail 268 does not go beyond its bottom position $O_B$ due to inertia of the downward movement and is kept at a desired distance away from the corresponding conveying lines 202, 204.

The packaging apparatus 200 further includes one or more support means 212, extending longitudinally between the pair of central tracks 260a, and 260b. The one or more support means 212 are adapted to move horizontally between the first end $E_F$ at the first conveying line 202 and the second end $E_S$ towards the second conveying line 204 through the top path T and/or the bottom path B formed at the central packaging frame 210 due to vertically upward and/or downward movement of the outer rails 268.

Figure 4A:
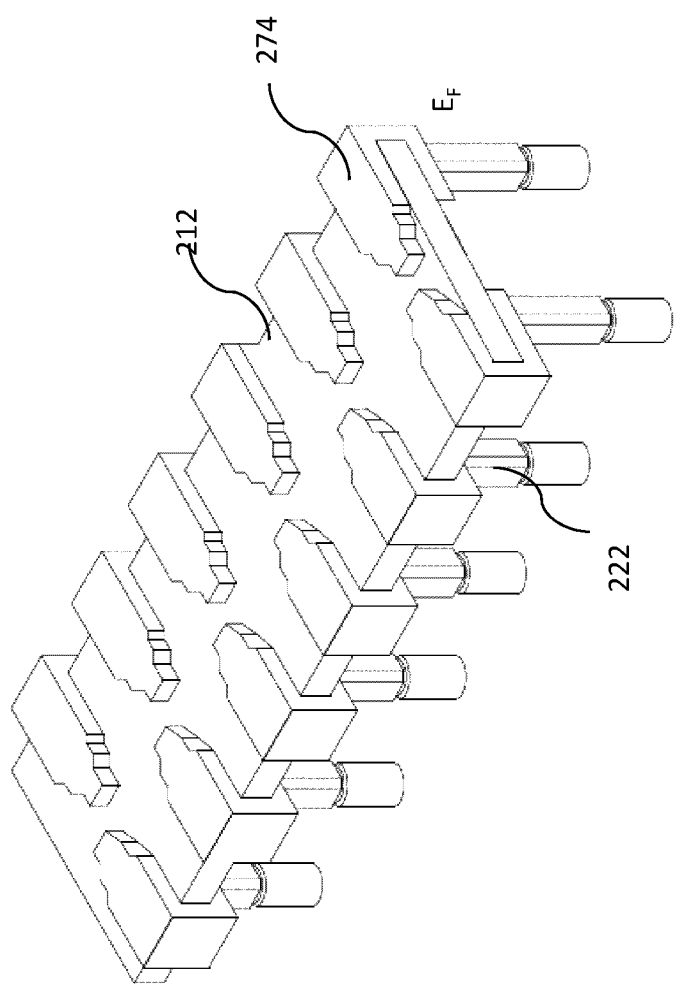
FIG. 4a illustrates an exemplary support means, in accordance with an embodiment of the present invention.

In an embodiment of the present invention as illustrated in FIG. 4a, the support means 212 may be in form of a support rail 212, comprising a generally linear rail adapted to be movingly connected to the central packaging frame 210 at each of the parallel central tracks 260a, 260b.

The packaging apparatus 200 further includes a horizontal movement mechanism 275 (FIG. 2b) for horizontally moving each of the support means 212 along the central packaging frame 210 between the first end $E_F$ and the second end $E_S$. In a preferred embodiment, the horizontal movement mechanism 275 includes a pair of support movers 214 (FIG. 2b), each configured at an opposite end of the supporting rail 212. Further, each of the support movers 214 is movingly connected to one of the central tracks 260 such that movement of the pair of support movers 214 allow the possibility of moving the corresponding support rail 212 horizontally across the central packaging frame 210 between the first end $E_F$ and the second end $E_S$.

Further, each of the supporting rails 214 is movable towards and away from each other in a widthwise direction $W_D$ along the central packaging frame 210 using the horizontal movement mechanism 275.

The packaging apparatus 200 further includes a plurality of gripper sets 220 movingly supported onto the support means 212 such that at least one of the gripper sets 220 is supported onto each of the support means 212, adapted to perform a pickup and/or release operations for the articles, e.g. beverage containers (Cans, Bottles) 290, during the packaging thereof.

Figure 3:
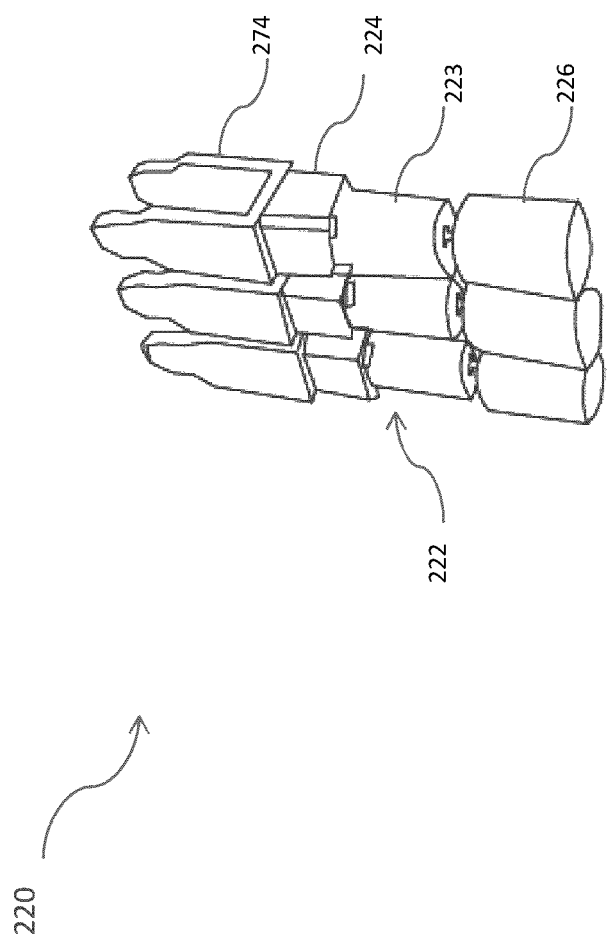
FIG. 3 illustrates an exemplary gripper set, in accordance with a preferred embodiment of the present invention.

The gripper sets 220 include a plurality of individual gripping heads 222 movingly supported and individually controlled onto the support means 212. In the case of the articles being a beverage bottle, the gripping head 222 is generally a bottle picker and/or releasing component. In a preferred embodiment, as illustrated in FIG. 3, the gripper head 222 includes a gripper body 224 extending towards a downwardly protruding beverage container head 226 adapted to selectively perform an operation selected from pick up and release operation. The beverage head 226 is of a shape and/or size and/or dimension complementary to the shape, size, and dimension of the beverage container 290 and/or a contact portion thereof so as to enable the possibility of performing the pick-up and/or release operation.

In some instances, the gripping head 222 includes one or more expandable membranes (not shown) configured onto an inner portion thereof, and adapted to be either pneumatically or electrically activated to be in contact with the beverage container such that when membrane is expanded by the said activation influence, the neck portion of the beverage container 290 gets locked within the beverage container head 226 thereby facilitating a picking thereof. Further, when the membrane is contracted back, the beverage head 226 releases the already picked up beverage container(s) 290 into the package 250.

Further in some instances, the gripping head 222 includes an integrated container orienting mechanism 223 adapted to rotate the bottles or containers, picked up, in a desired orientation before dropping these onto the second conveying line 204. The mechanism may optionally spin the containers at controlled angular velocity while in transit. The container orienting mechanism 223 may be selected from one or more of, but not limited to, any suitable conventional rotating mechanism such as a rotational servo, stepper, permanent magnet, dc or ac motor, and the like and incorporate an encoder or other angular position sensing device.

In other embodiments, the gripping head may be selected from any conventionally mechanism known in the art and suitable for picking and/or releasing articles such as the beverage containers 290.

In some preferred embodiments as illustrated in FIG. 4b, the support means 212 includes a combination of one or more parallel rails 212a, 212b, each adapted to hold a row of gripper heads 222 of the one or more gripper sets 220 such that each of the gripping heads 222 is individually movable along the corresponding support rail 212a, 212b, using one or more gripper movement mechanism. In some instances, the gripper movement mechanism includes a plurality of gripping movers 274 movingly configured onto each of the support rails 212a, 212b such that each of the gripping movers 274 is adapted to movingly engage one of the gripping head 222 therewith, and powered by a powering means selected from one or more of but not limited to a linear motor, serve motor, gear based transmission, and the like. In a preferred embodiment, the powering means is a linear motor. In such an embodiment, the linear motor is a generally moving magnet type of motor conventionally known in the art. In one such instance, the linear motor utilizes the corresponding support rail 212 as a stator and each of the corresponding gripping mover 274 as a rotor thereof. Further in such embodiments, the predetermined arrangement of the gripping heads 222 within each of the gripper sets 220 may be changed dynamically in accordance with a desired arrangement of gripping heads 220. Moreover, in such an embodiment, the rails 212 may be moved widthwise, and the gripping heads 222 may be moved in a lengthwise direction such that number of gripping heads 222 within one or more of the gripper sets 220 may be changed dynamically.

Alternatively, in some embodiments, each of the gripping heads 222 is stationary to the corresponding gripper set 220, which in turn is itself movable along a single support rail 212 using the one or more gripper moving mechanism. In such instances, the gripper moving mechanism includes a plurality of gripping movers 274 movingly configured onto the support rails 212 such that each of the gripping movers 274 is adapted to movingly engage one of the gripper set 220 therewith, and powered by a powering means selected from one or more of but not limited to a linear motor, serve motor, gear based transmission, and the like. The working of the linear motor is same as discussed already. Further in such embodiments, the predetermined arrangement of the gripping heads 222 within each of the gripper sets 220 may be changed dynamically only in a widthwise direction by moving the support rails 212 widthwise.

Figure 5A:
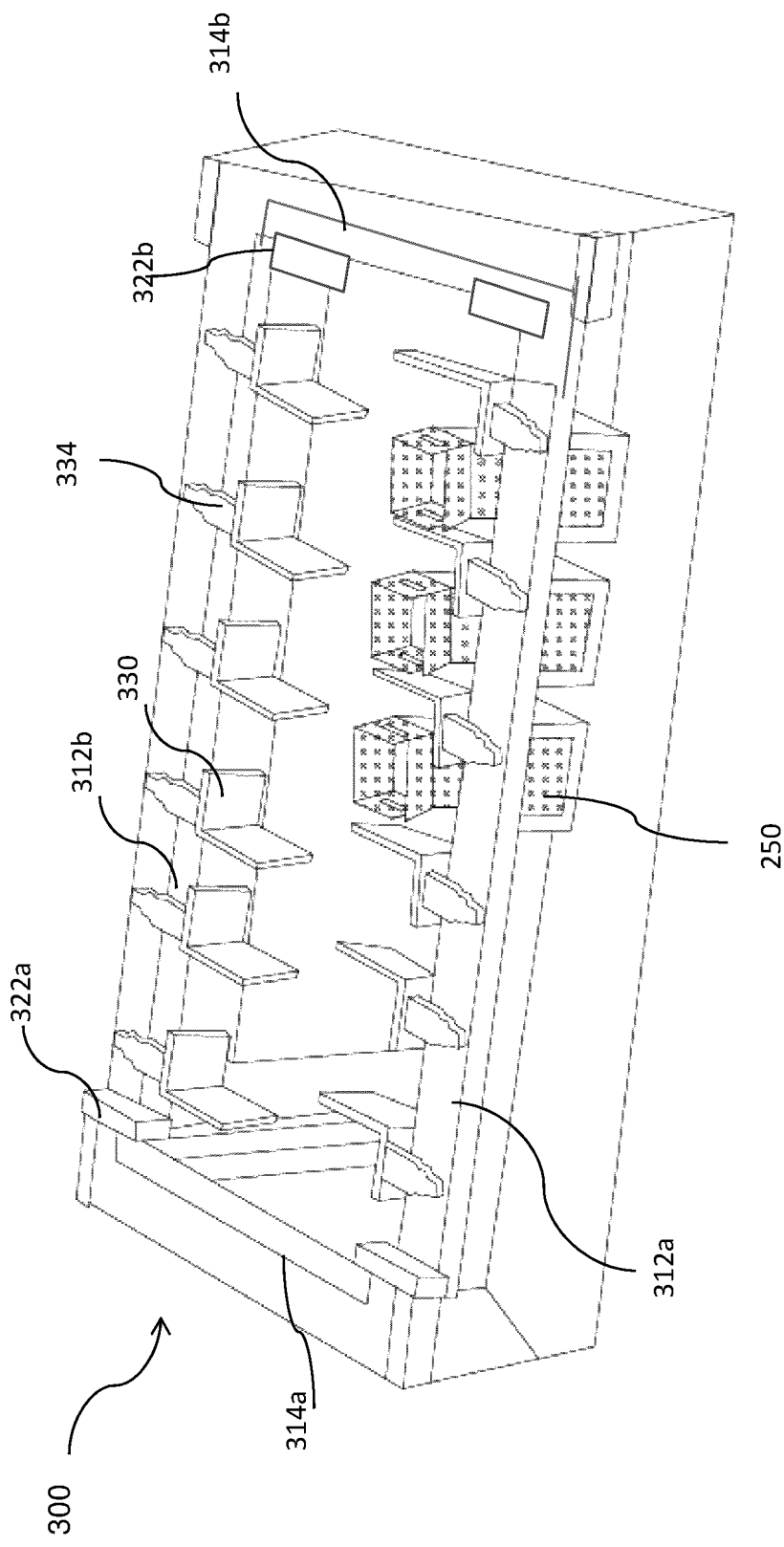
FIG. 5a, 5b, 5c, 5d illustrates an exemplary guiding unit, in accordance with a preferred embodiment of the present invention.
Figure 5B:
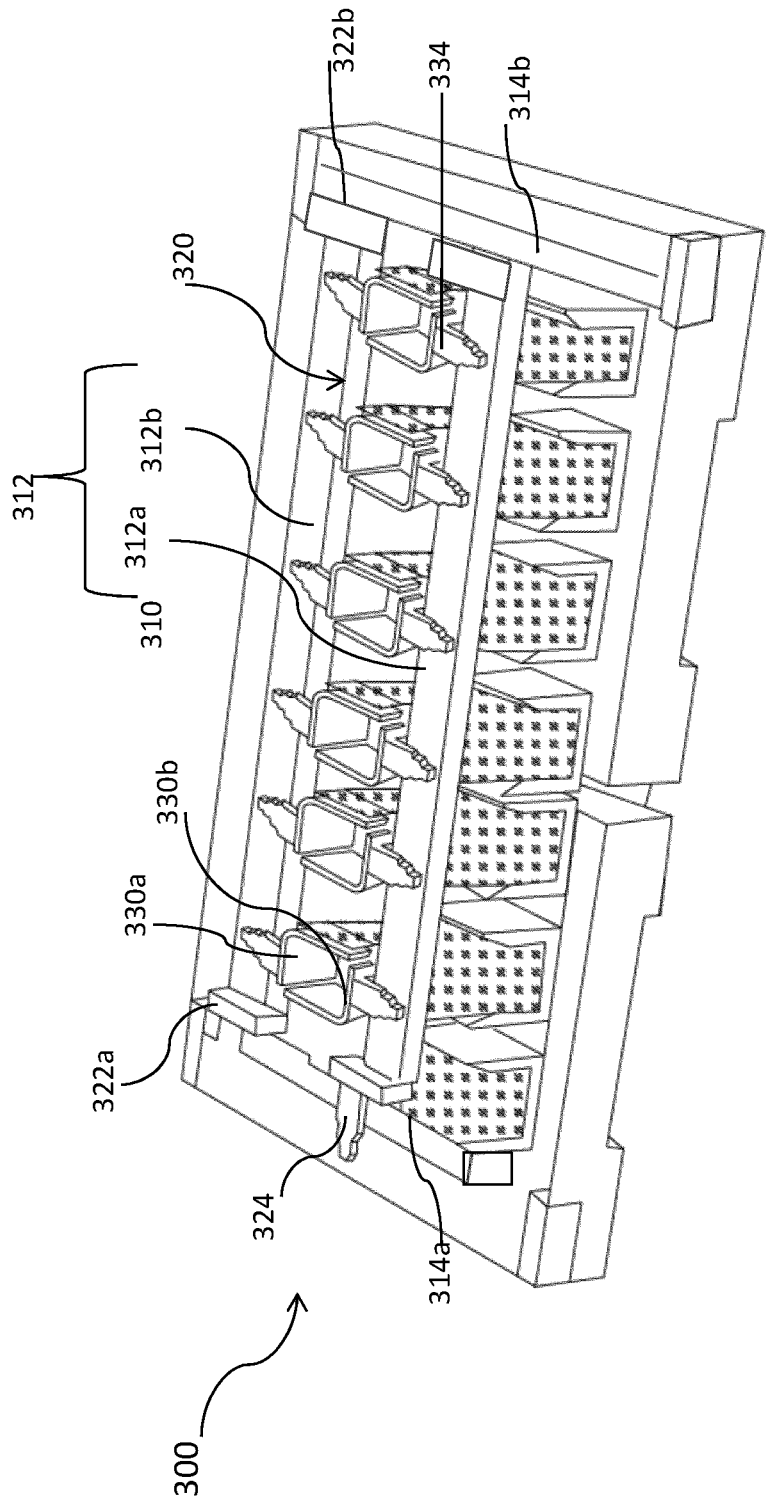
Figure 5C:
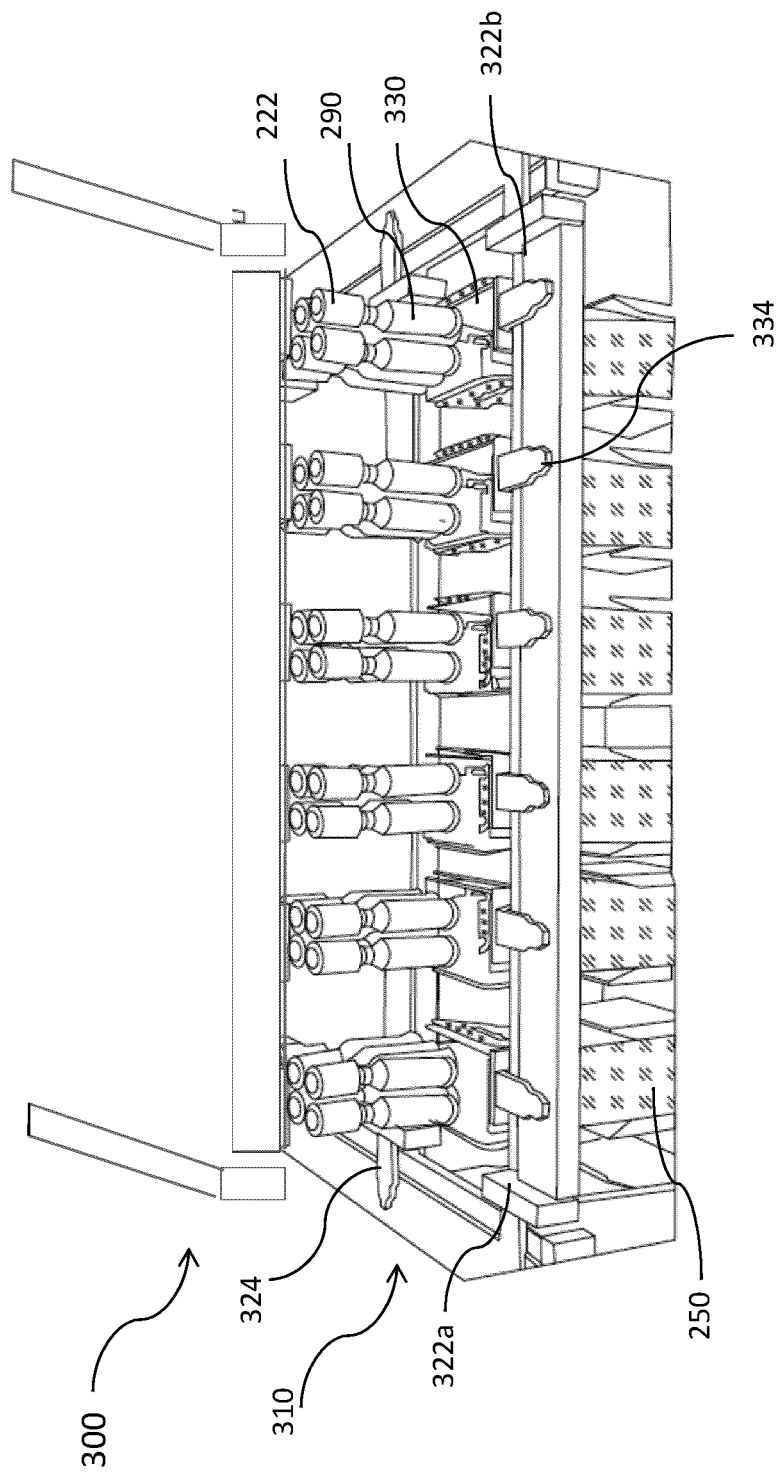

In an embodiment of the present invention, as illustrated in FIGS. 5a, 5b, 5c, the packaging apparatus 200 further includes a guiding unit 300 for facilitating the release of the already picked beverage containers 290 within the package 250 such that a closure of the package 250 is avoided during the release operation. Further, such a guiding unit 300 is adapted to guide the operation of the releasing the containers 290 within the package 250 with a funnel effect, so as to avoid any contact between the containers 290 and sidewalls 252 of the package 250 such that any damage or scratch to the package 250 and/or beverage containers 290 during the release operation is avoided. The guiding unit 300 includes an overhead frame 310 formed of at least two spaced apart generally parallel longitudinal rails 312 including a first longitudinal rail 312a, and a second longitudinal rail 312b connecting and extending between two or more spaced apart generally parallel transverse rails 314 including a first transverse rail 314a, and a second transverse rail 314b. Each of the longitudinal rails 312a, and 312b is movable in a horizontal direction towards and away from each other using one or more guiding rail movement mechanism 320 (FIG. 5b).

The guiding rail movement mechanism 320 is generally a mechanism allowing the possibility of movement of longitudinal rails 312 of the overhead frame 310 along the transverse rails 314. In a preferred embodiment, the guiding rail movement mechanism 320 includes one or more pairs of engaging members 322 comprising a first engaging member 322a, and a second engaging member 322b, each pair of the engaging members 322 adapted to engage one of the longitudinal rails 312 at its opposite ends.

Further, the guiding rail movement mechanism 320 includes a plurality of engaging movers 324 (FIG. 5b) movingly connected to the transverse rails 314. Each of the engaging movers 324 is adapted to movingly engage one of the engaging member 322 such that a horizontal movement of each of the pair of engaging member 322 along the corresponding transverse rails 314 is made possible thereby enabling a movement of longitudinal rails 312 in a direction towards and away from each other.

The guiding rail movement mechanism 320 furthermore includes a powering means (not shown) for powering the horizontal movement of each of the plurality of engaging movers 324. In a preferred embodiment, the powering means is a linear servo motor that utilizes the transverse rails 314 as stator and each of the guiding movers 324 as a rotor thereof.

The guiding unit 300 further includes one or more pair of parallel guiding means 330 (FIG. 5b), including a first guiding means 330a, and a second guiding means 330b movably connected to the parallel longitudinal rails 312a and 312b through a plurality of guiding movers 334. Each of the opposite pair of guiding means 330 is adapted to be received within the package 350 such that each of the guiding means 330a, 330b conforms to at least one an inner side wall/corner of the package 250 such that when in contact with the side-wall it avoids a closure of a side-flap extending there-through, the package 250 to be shaped there-between the longitudinal rails 312. The guiding unit 300 further includes one or more powering means (not shown) for powering the movement of each of the plurality of guiding movers 334 and therefore the independently movable guiding means 330 across the longitudinal rails 312.

The packaging apparatus 200 further includes a first powering means (not shown) for enabling a vertical movement of the one or more pair of outer rails 268, including the central tracks 260, and various sub-components thereof. In a preferred embodiment, the first powering means is a linear servo motor adapted to move each of the outer rails 268 at a first predetermined pitch for facilitating a continuous operation of each of the component of the packaging apparatus 200 such that the support means 212 is continuously movable between the first end $E_F$ and the second end $E_S$ through one of the top path T and/or bottom path B. However, in other embodiments, the first powering means is a linear servo motor adapted to move each of the outer rails 268 at a dynamically adjustable variable pitch for facilitating an intermittent or continuous operation of each of the components of the packaging apparatus 200.

Further, the packaging apparatus 200 includes a second powering means (not shown) for enabling a movement of each of the movers including, the support movers 214, the gripping movers 274, the engaging movers 324, the guiding movers 334, independently along the corresponding central packaging frame 210, the support rails 212, the transverse rails 314, and the longitudinal rails 312 respectively. In a preferred embodiment, the first powering means is linear servo motor. In such an embodiment, the linear motor is a generally moving magnet type of motor conventionally known in the art.

In other embodiments, the movers 214, 274, 324, 334 are utilized as stator whereas the rails are utilized as the rotors. In such an embodiment, each of the movers 214, 274, 324, 334 includes built in coils and each of the corresponding tracks include a plurality of magnets configured thereon in a longitudinal direction such that the movers 214, 274, 324, 334 are able to come into an electromagnetic interaction thereby enabling a movement thereof.

The packaging apparatus 200 may further include one or more control units (not shown) for managing the operations thereof, and particularly for managing the working of each of the outer rails 268, the first powering means and/or the second powering means to optimize the movement of the support rails 214, gripping heads 222, guiding unit 320 and all other components of the packaging apparatus 200. The optimized set of movement sequence is determined by the control unit in accordance to the factors such as including but not limiting to pitch of gripper sets 220, pitch difference between the conveying lines 202, 204, speed of each of the conveying lines 202, 204, predetermined arrangement of the gripping heads 222 within the gripper set 220, and the like.

In some embodiments, the control unit may include a input unit for receiving the predetermined arrangement of beverage containers 290 to be formed and received within the secondary package 250. Further, the control unit may include a plurality of sensors for tracking the parameters such as for example, position of the package arrangement of beverage containers 290 and the like. The control unit may further include a processor unit for processing the data captured by the input unit on the basis of predetermined logics and/or rules for facilitating the movement of the plurality of movers 214, 274, 324, 334 of the packaging apparatus 200. The control unit may further include an instruction unit that delivers the instructions to various components such as various powering means, linear motors, motors, driving units, or the like, to facilitate a desired and smooth operation.

In some embodiments, the control unit may be provided as a computer program product, such as may include a computer-readable storage medium or a non-transitory machine-readable medium maintaining instructions interpretable by a computer or other electronic device, such as to perform one or more processes.

FIG. 2 schematically shows the arrangement of the basic components of the packaging apparatus 200 of the present invention. However, in the construction of commercial functional units, secondary components such as couplers, connectors, support structures and other functional components known to one of skill in the field of packaging apparatuses, may be incorporated within the packaging apparatus 200. Accordingly, it is to be contemplated that the packaging apparatus 200 may be configured to be used for any kind of (secondary) package of any possible shape as deems possible without deviating from the scope of the current invention.

In a preferred embodiment, the package generally represented by the numeral 250, may be formed from a recyclable material selected from one or more of but not limited to any desired material such as including all kind of papers, fiberboard, corrugated board, laminated board, hybrid material, or any combinations thereof. Further, the shape and size, including the diameter and height of the package 250 may be varied depending on the design constraints and requirements for its application. For example, within the instances when the 250 is adapted to house twelve containers in one layer in a 3×4 arrangement the carton is dimension accordingly. Further, in other instances, the carton may be sized and shaped to hold containers of a different or same quantity in a single layer, more than one layer, and/or in different row/column arrangements (e.g., 1×6, 3×6, 2×6, 4×6, 2×3×4, 2×6×2, 2×9, 3×5, 3×5×2, etc.). Further, in yet other instances, the packages 250 may be formed in various possible symmetrical as well as asymmetrical shapes.

In some embodiments, the packaging apparatus 200 is positioned onto an overlying manipulator adapted to move upward and/or downward between the first and second conveying lines 202, 204. In yet other embodiments, the packaging apparatus 200 may be positioned within in any possible direction generally perpendicularly in the instances where the first conveying line 202 is generally parallel to the second conveying line 204, or otherwise generally in a direction of flow of the process of packaging in the instances where a point of pick-up of beverage containers 290 is generally in line with a point of drop-down within the secondary packages 250 at the second conveying line 204. In yet other embodiments, the packaging apparatus 200 may be positioned in any possible configuration in accordance with the design constraints of the conveying lines 202, 204.

Figure 5D:
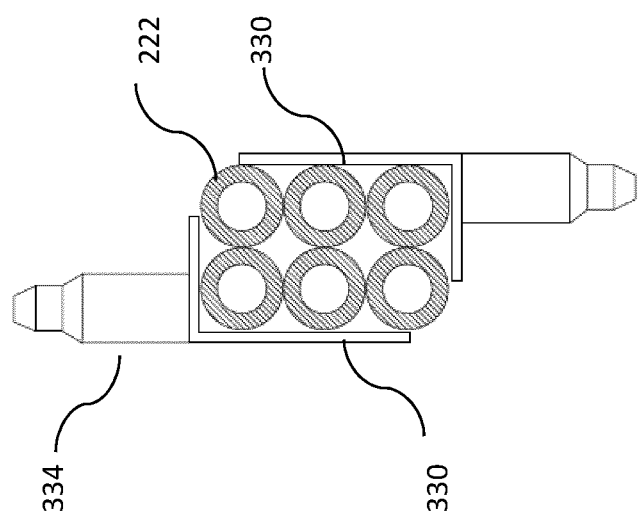

In a preferred embodiment of the present invention as illustrated in FIG. 5d, one pairs of guiding means 234, each having a generally L shaped adapted to support two adjacent walls of the secondary package 250. However, in other embodiments, any number of pair of guiding means 234, may be used in accordance to the shape of the package 250.

Figure 6A:
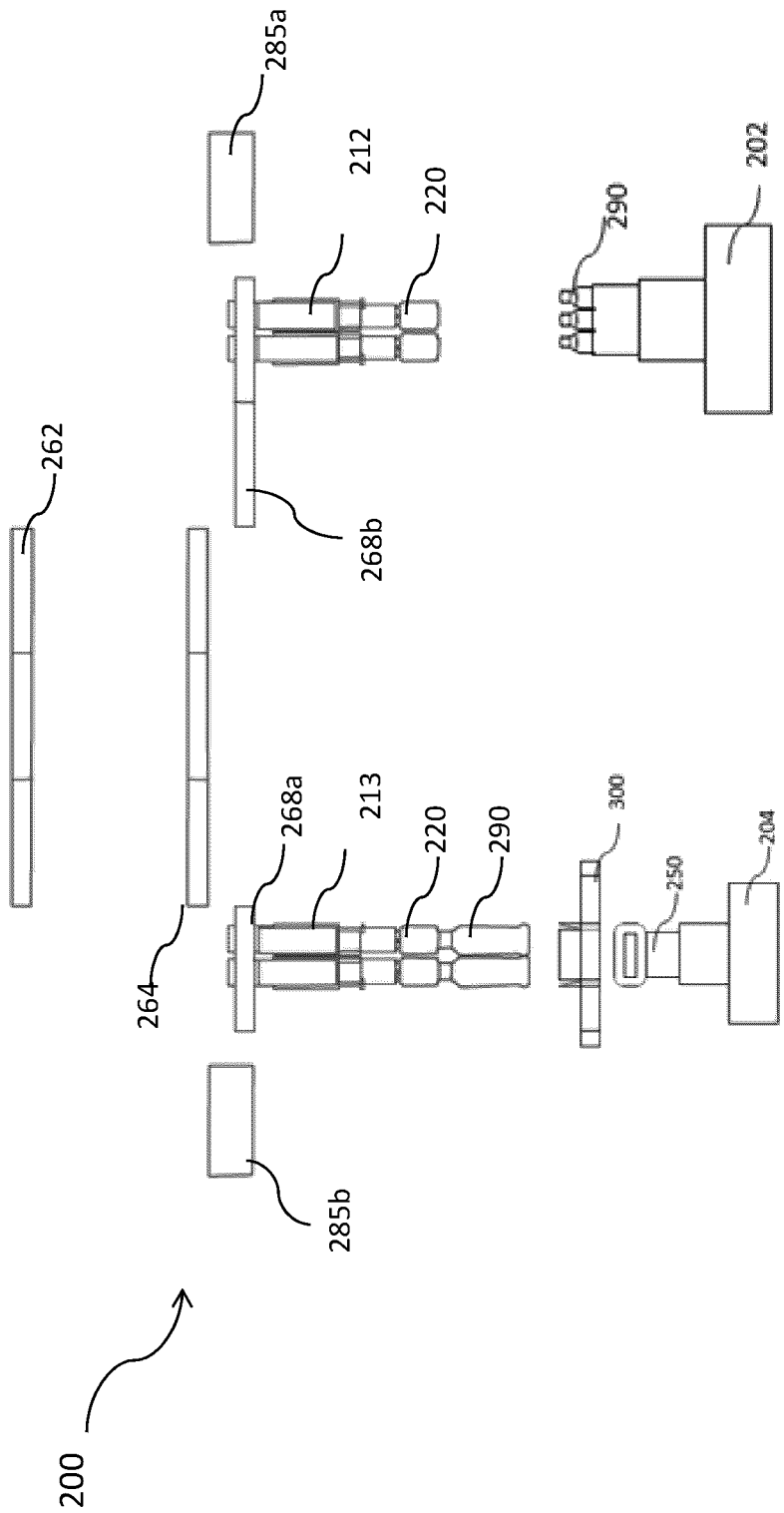
FIG. 6a, 6b, 6c illustrates an exemplary packaging of a supply of beverage containers using the apparatus of the present invention.
Figure 6B:
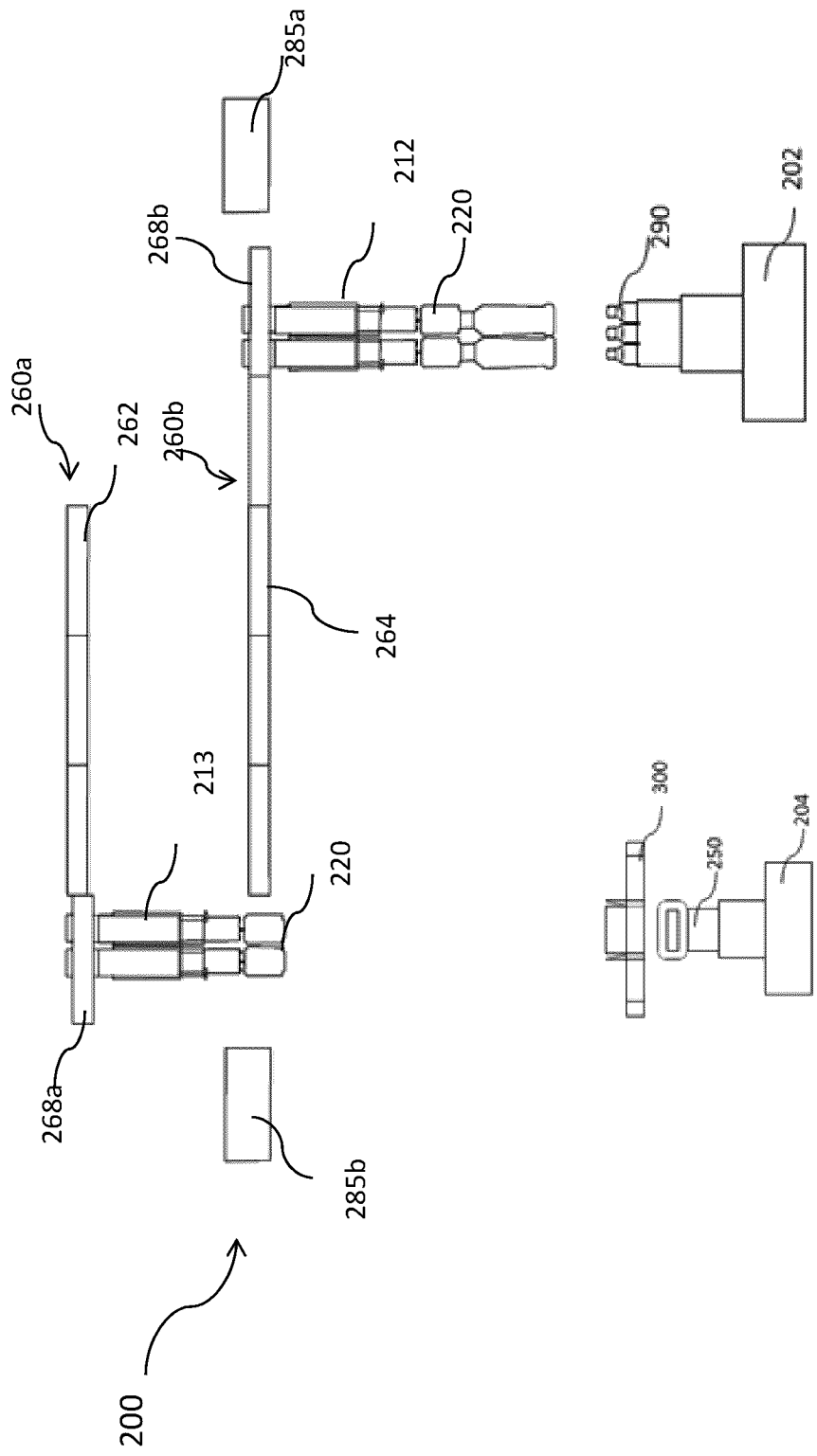
Figure 6C:
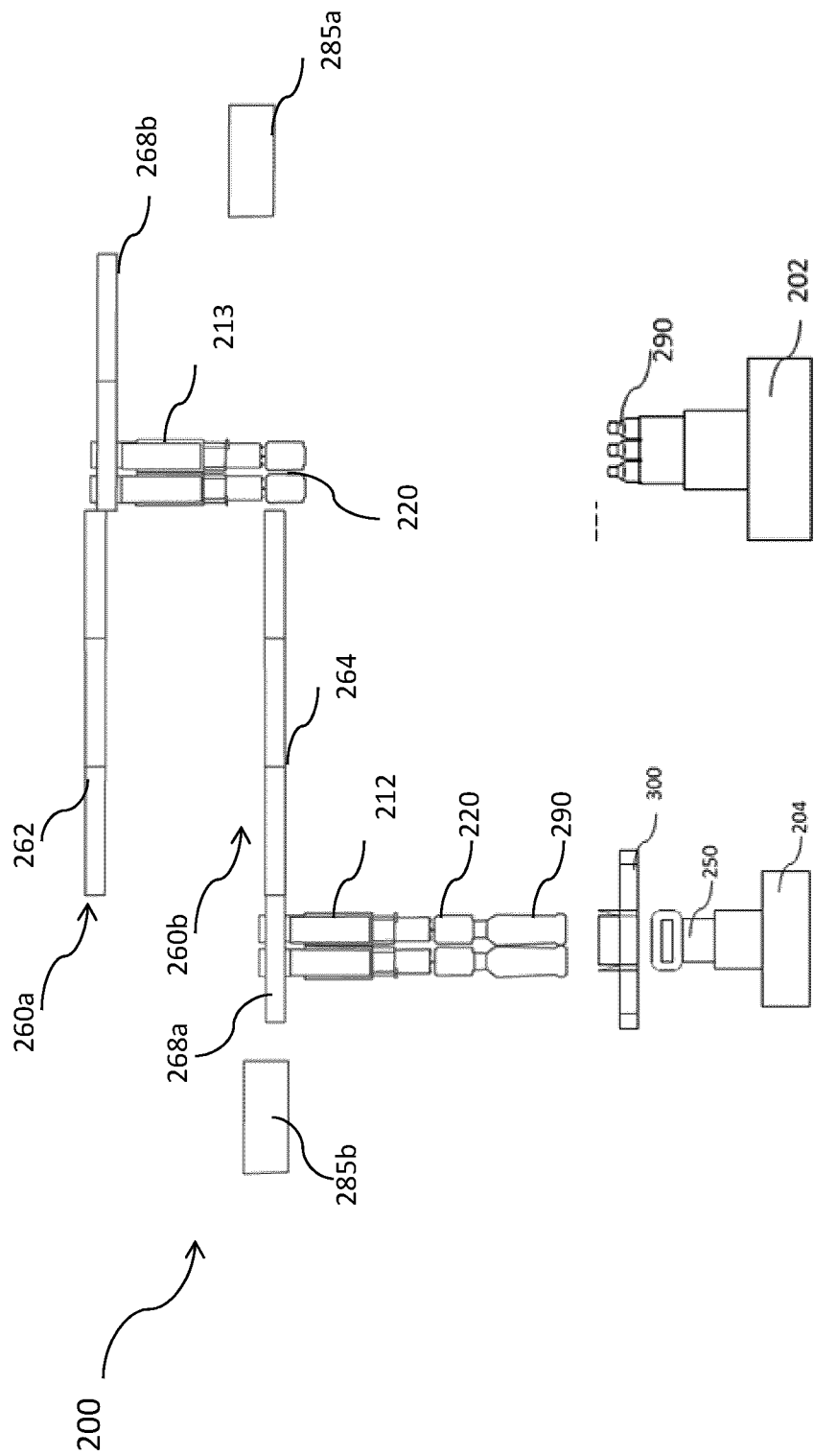
Figure 7:
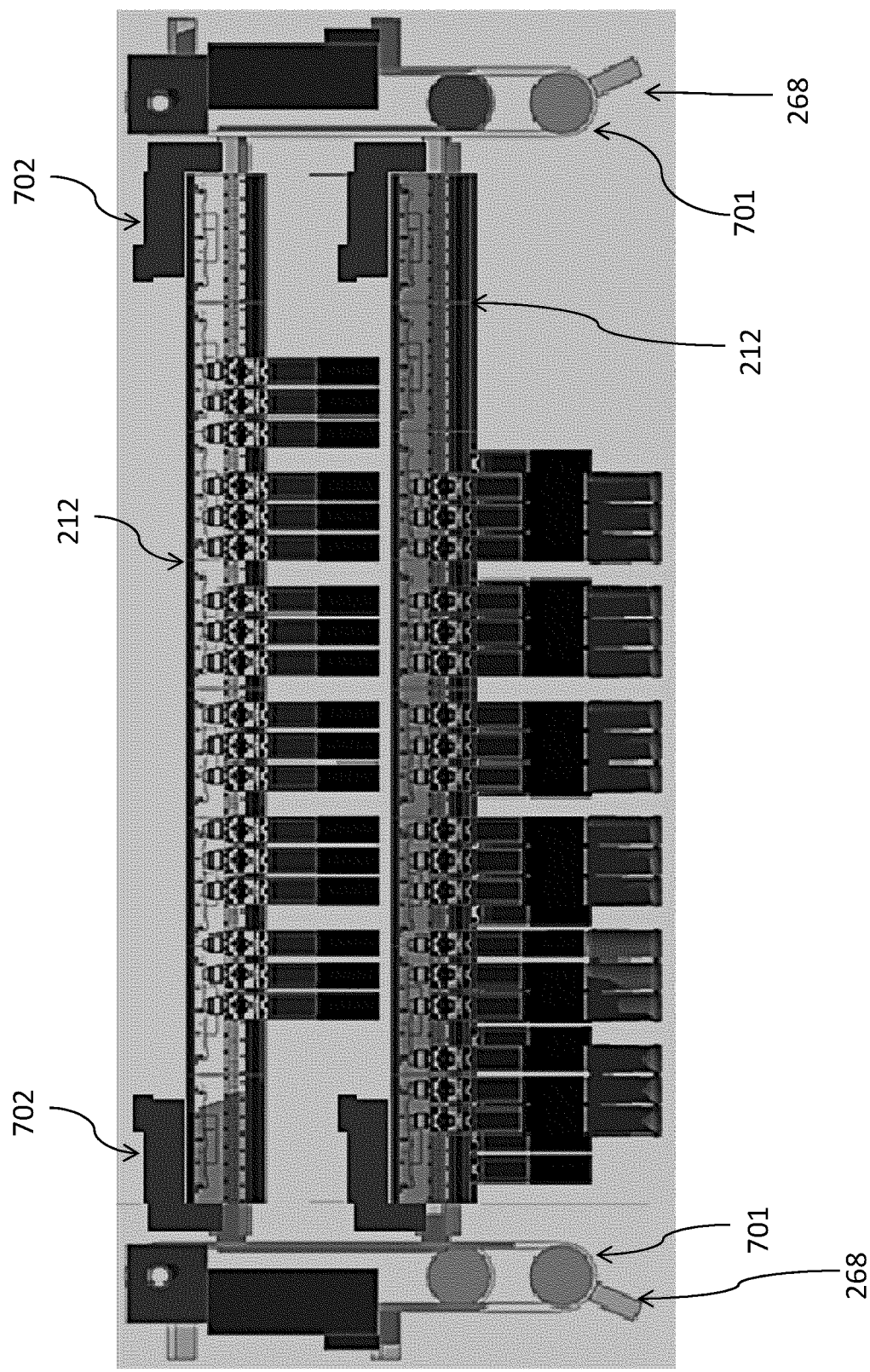
FIG. 7 represents a packaging apparatus, in accordance with a preferred embodiment of the present invention.

While as may be understood from the above method, transfer of support means 212 through the top path T and/or the bottom path B is possible in many ways due to vertical movement of outer rails 268 in different permutation and combinations, an exemplary method flow is disclosed with FIGS. 6a, 6b and 6c for performing the packaging operation using the packaging apparatus 200 of the current disclosure having a first support rails 212 and a second support rail 212. As can be seen in FIG. 6a, at an initial stage, gripper set 220 of the first support rail 212 is adapted to pick-up the beverage containers 290 from the first conveying line 202 and the gripper set 220 of the second support rail 212 is adapted to release already picked-up beverage containers 290 at the second conveying line 204. In such a position, both pair of outer rails, 268a, and 268b of each of the central tracks 260a, 260b is at its bottom most position $O_B$. At the next step as illustrated in FIG. 6b, the outer rails 268a moves to its top position $O_T$ where they connects to the top rail 262 of each of the central tracks 260, and moves towards the first end $E_F$ from the top path T as illustrated in FIG. 6c. Further, the outer rails 268b moves to its bottom position $O_B$ as illustrated in FIG. 6b where they connects to the bottom rail 264 of each of the central tracks 260, and moves towards the second end $E_S$ from the bottom path B as illustrated in FIG. 6c. Once reach the opposite ends, each of the first support rail 212, and the second support rail 212 repeats the operations as described above. Similarly, in other embodiments, the order of movement of outer rails 268 may be changed to provide a different flow of the movement of each of the support rails 212, 212 between the first end $E_F$ and the second end $E_S$. Such a movement of the outer rails 268, and therefore, the support means 212, 212 and the corresponding gripper sets 220 for performing the pickup and/or the release operations, may be performed either continuously, or otherwise intermittently, as desired.

INDUSTRIAL APPLICABILITY

The packaging apparatus 200 includes a plurality of support rails 212 comprising gripping sets 220, and movable simultaneously along the central packaging frame 210, for performing a pick up and/or release operation into packages 250. The predetermined arrangement may be changed dynamically by moving the gripping heads 222 and the support rails 214 so as to form a desired arrangement and therefore packaging of any size, shape, structure of (secondary) packages 250 can be realized without the need of changing any component and is well suitable to process packages of different sizes with ease and efficiency.

Particularly advantageously, the packaging apparatus 200 due to formation of two different paths, the top path T and the bottom path B, allows using a lesser number of support rails 212 for transferring a large number of gripper sets 220, each taking a different route to travel between the first end $E_F$ and the second end $E_S$. Further, due to lesser number of support rails 212, the packaging apparatus 200 is cheaper and smaller in overall size, while being quicker, having higher throughput and flexibility, than any other conventional packaging means.

Moreover, the packaging apparatus 200 brings together the individual operations of dynamic picking, collating, grouping, orientation, pitching and dynamic dropping of the articles 290 into a package 250, in a single common apparatus and therefore, enhancing overall performance.

As may be well recognized by a person skilled in the art, the package apparatus 200, articles 290 and packages 250 of the current disclosure may be implemented in various industries such as food industry, transport industry, house hold appliance industry in transportation of any kind of product or groups of products, of any shape, size or any variety of configurations, without limiting it to the beverage industry.

The invention claimed is:

1. A packaging apparatus for articles comprising:
   a central packaging frame extending between a first end and a second end, the frame comprising:
      a pair of spaced apart generally parallel transversal central tracks, each track having a top rail vertically spaced apart and connected to a bottom rail through a central body portion; and
      a plurality of outer rails, at least one outer rail configured at each end of the pair of central tracks, the outer rails adapted to move up and down so as to optionally connect to one of the top rails and/or the bottom rails of the central track and define respectively a top path and a bottom path there through;
   one or more support means, each extending generally longitudinally between the pair of central tracks, and adapted to support one of more gripper sets; each of the gripper sets comprising a plurality of individual gripping heads arranged in a predetermined configuration;
   a vertical moving mechanism for enabling a vertically upward and/or downward movement of each of the outer rails independently between a top and bottom position of each of the outer rails;
   a horizontal moving mechanism for moving the one or more support means through at least one of the top and/or bottom path;
   wherein
   the upward and/or the downward movement of each of the outer rail between the top and bottom position of each of the outer rails and the horizontal movement of each of the support means is synchronized in such a way that the gripper sets on at least one of the support means is adapted to pick up a set of articles from a first conveying line at the first end and the gripper sets on at least one other support means is adapted to release already picked up articles into a package at a second conveying line at the second end, simultaneously.

2. The apparatus of claim 1, wherein the plurality of support means comprising a plurality of support rails configured to carry the gripper sets.

3. The packaging apparatus of claim 1, wherein the horizontal movement mechanism comprising one of more pair of support movers, each pair of the support movers adapted to engage one of the support rails at its opposite ends and movingly configured onto one of the pair of central tracks and the corresponding connected outer rails, thereby enabling a horizontal movement of the support rails along the corresponding top path and/or bottom path between the first end and the second end.

4. The apparatus of claim 1, wherein the vertical movement mechanism comprising a rail moving slot at each end of the pair of central tracks throughout its central body portion such that the corresponding outer rail is slidably movable there through between its top position and the bottom position.

5. The apparatus of claim 1, wherein the frame further comprising a pair of outer support platforms, each configured generally perpendicularly and between the central tracks, and adapted to support each of the outer rails and corresponding support means to go beyond its bottom position such that each of the gripper set is at a height sufficient to perform the pickup and/or the release operation.

6. The apparatus of claim 1, further comprising a gripper moving mechanism for longitudinally moving the one or more gripper sets towards and/or away from each other, onto the corresponding support means.

7. The apparatus of claim 6, wherein the gripper moving mechanism comprising a plurality of gripping movers movingly configured onto the support means, each of the movers adapted to movingly engage one of the gripping head therewith.

8. The apparatus of claim 2, wherein each of the one or more support rails are movable in a widthwise direction and each of the gripper head is movable within a length wise direction such that such that the gripper set having a desired configuration of the gripper heads may be achieved.

9. The apparatus of claim 1, wherein each of the gripper-set of the plurality of gripper sets has a varying adjustable pitch there between.

10. The apparatus of claim 1, wherein the gripper head comprises a gripper body extended towards a downwardly protruding head, adapted to selectively perform a pick up and release operation of beverage containers.

11. The apparatus of claim 1, wherein first conveying line comprising an output of beverage container manufacturing unit having one or more means for grouping and/arranging the beverage containers in the predetermined configuration.

12. The apparatus of claim 1, wherein the second conveying line comprising an output of a carton forming unit.

13. The apparatus of claim 1 further comprising a guiding unit adapted to keep the package at the second conveying line opened during the release of already picked up beverage containers therein.

14. The apparatus of claim 1, wherein the vertical movement mechanism of the one or more outer rails comprises a vertical closed loop transportation unit, and wherein the horizontal movement mechanism comprises motors configured onto the support means.

15. The apparatus of claim 1, wherein the gripper sets and/or the gripping heads are wirelessly powered and/or wirelessly controlled.

* * * * *